US011731672B2

(12) United States Patent
Jordan et al.

(10) Patent No.: US 11,731,672 B2
(45) Date of Patent: Aug. 22, 2023

(54) AUTOMATED SIGNAL COMPLIANCE MONITORING AND ALERTING SYSTEM

(71) Applicant: Wi-Tronix, LLC, Bolingbrook, IL (US)

(72) Inventors: Lawrence B. Jordan, Bolingbrook, IL (US); Brandon Schabell, Bolingbrook, IL (US); Bryan Weaver, Bolingbrook, IL (US); Pradeep Ganesan, Bolingbrook, IL (US); Roger Martinez, Bolingbrook, IL (US); Jagadeeswaran Rathinavel, Bolingbrook, IL (US); Sergio E. Murillo Amaya, Bolingbrook, IL (US)

(73) Assignee: Wi-Tronix, LLC, Bolingbrook, IL (US)

( * ) Notice: Subject to any disclaimer, the term of this patent is extended or adjusted under 35 U.S.C. 154(b) by 307 days.

(21) Appl. No.: 16/833,590

(22) Filed: Mar. 28, 2020

(65) Prior Publication Data

US 2020/0307614 A1    Oct. 1, 2020

Related U.S. Application Data

(60) Provisional application No. 62/829,730, filed on Apr. 5, 2019, provisional application No. 62/825,943, filed on Mar. 29, 2019.

(51) Int. Cl.
*H04W 4/12* (2009.01)
*H04L 67/06* (2022.01)
(Continued)

(52) U.S. Cl.
CPC .......... *B61L 15/0072* (2013.01); *H04L 67/06* (2013.01); *H04W 4/12* (2013.01); *B61L 23/041* (2013.01); *B61L 27/57* (2022.01)

(58) Field of Classification Search
CPC combination set(s) only.
See application file for complete search history.

(56) References Cited

U.S. PATENT DOCUMENTS

2011/0216200 A1    9/2011  Chung
2016/0140404 A1    5/2016  Rosen
(Continued)

FOREIGN PATENT DOCUMENTS

AU    2004100077    3/2004
CN      1937764     3/2007
(Continued)

*Primary Examiner* — Anne Marie Antonucci
*Assistant Examiner* — Amelia Vorce
(74) *Attorney, Agent, or Firm* — Rockman Videbeck & O'Connor

(57) ABSTRACT

An automated signal compliance monitoring and alerting system (ASCMAS) that automatically monitors and provides historical and real-time alerting for mobile assets in violation of a signal aspect, such as a stop light, traffic light, and/or speed limit signal, and/or operating the mobile asset unsafely in an attempt to maintain compliance to a signal. ASCMAS works in conjunction with a data acquisition and recording system (DARS) for mobile assets that includes a data center onboard the mobile asset and a data center remote from the mobile asset. A first artificial intelligence model of at least one of the data centers determines whether the mobile asset is a leading and/or controlling mobile asset. From video content obtained from one of the data centers, a second artificial intelligence model determines an episode involving the mobile asset.

24 Claims, 24 Drawing Sheets

(51) Int. Cl.
  *B61L 15/00*  (2006.01)
  *B61L 27/57*  (2022.01)
  *B61L 23/04*  (2006.01)

(56) References Cited

U.S. PATENT DOCUMENTS

| | | |
|---|---|---|
| 2016/0159381 A1 | 6/2016 | Fahmy |
| 2017/0208435 A1 | 7/2017 | Jordan et al. |
| 2017/0327138 A1 | 11/2017 | Jordan et al. |
| 2018/0050800 A1 | 2/2018 | Boykin et al. |
| 2019/0176862 A1* | 6/2019 | Kumar ................... B64D 47/08 |
| 2019/0281578 A1* | 9/2019 | Nabetani ................ H04B 7/022 |
| 2020/0001906 A1* | 1/2020 | Bramucci ............ B61L 15/0072 |
| 2022/0292956 A1* | 9/2022 | Matus .................. G08G 1/0133 |

FOREIGN PATENT DOCUMENTS

| | | |
|---|---|---|
| CN | 105531967 | 8/2016 |
| CN | 108028873 | 5/2018 |
| WO | WO2017201085 | 11/2017 |
| WO | 2018080650 | 5/2018 |
| WO | WO2018080650 | 5/2018 |

* cited by examiner

| Append to CHM Record Segment | Full Record Block | |
|---|---|---|
| Overwrite Temp CHM Location 1 | Interim Record Block | |
| < = 1 Second ... | | |
| Overwrite Temp CHM Location 2 | Interim Record Block | 5 Minutes |
| < = 1 Second ... | | |
| Overwrite Temp CHM Location 1 | Interim Record Block | |
| < = 1 Second ... | | |
| Overwrite Temp CHM Location 2 | Interim Record Block | |
| ... | | |

FIG. 5

CHM Record Segment:

| |
|---|
| Full Record Block (2/1/2016 10:00:00 AM) |
| Full Record Block (2/1/2016 10:05:00 AM) |
| Full Record Block (2/1/2016 10:10:00 AM) |
| Interim Record Block (2/1/2016 10:10:08 AM) |

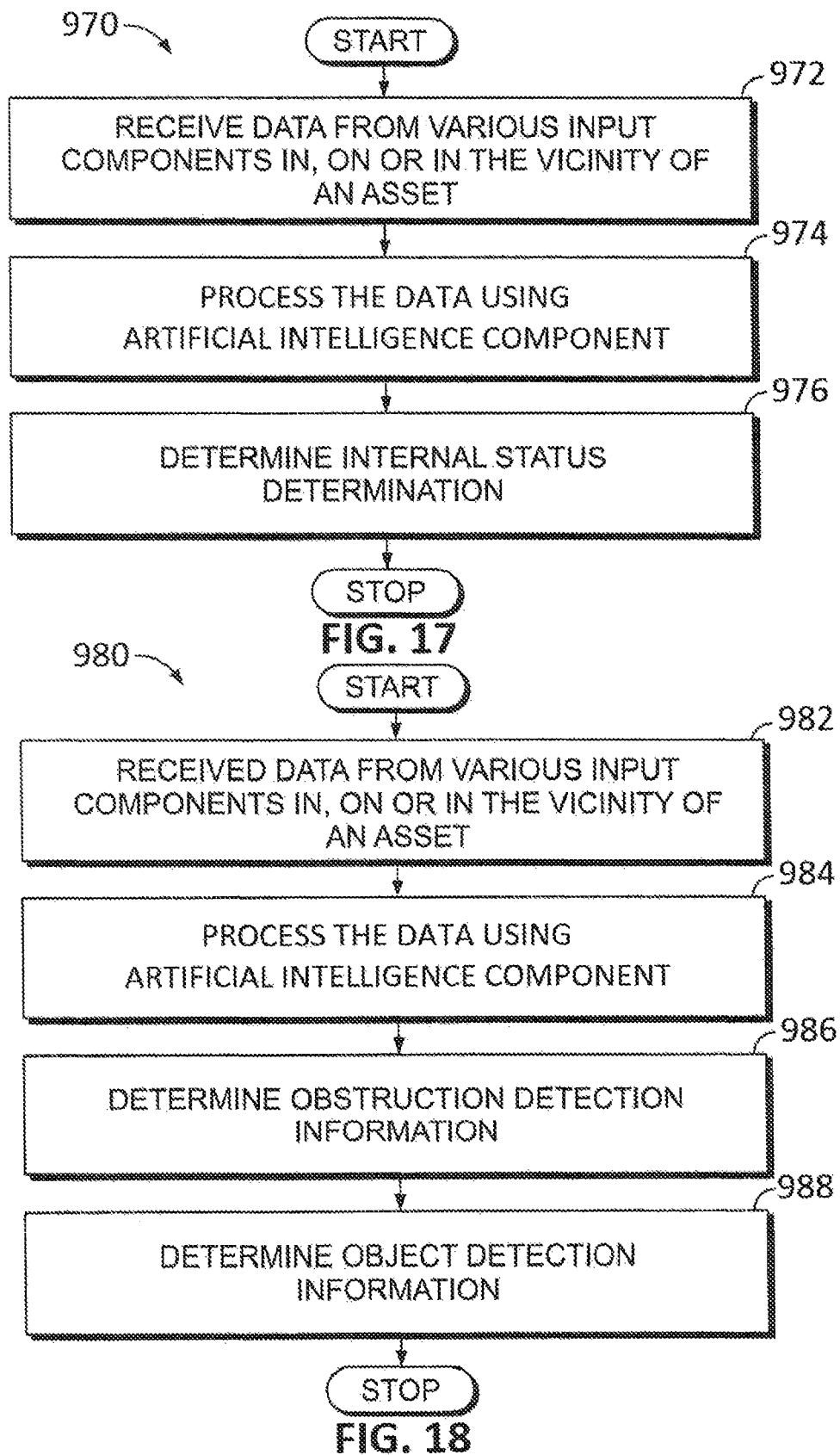

AUTOMATED SIGNAL COMPLIANCE MONITORING AND ALERTING SYSTEM

CROSS-REFERENCE TO RELATED APPLICATION(S)

This application claims priority to U.S. Provisional Application No. 62/825,943, filed Mar. 29, 2019, and claims priority to U.S. Provisional Application No. 62/829,730, filed Apr. 5, 2019, to the extent allowed by law and the contents of which are incorporated herein by reference in their entireties. This application also claims priority to U.S. Provisional Application No. 62/337,227, filed May 16, 2016; U.S. Non-provisional patent application Ser. No. 15/595,650, filed May 15, 2017, now U.S. Pat. No. 9,934,623, issued Apr. 3, 2018; U.S. Non-provisional patent application Ser. No. 15/907,486, filed Feb. 28, 2018, now U.S. Pat. No. 10,445,951, issued Oct. 15, 2019; U.S. Provisional Application No. 62/337,225, filed May 16, 2016; U.S. Non-provisional patent application Ser. No. 15/595,689, filed May 15, 2017, now U.S. Pat. No. 10,410,441, issued Sep. 10, 2019; U.S. patent application Ser. No. 16/385,745, filed Apr. 16, 2019; U.S. Provisional Application No. 62/337,228, filed May 16, 2016; U.S. Non-provisional patent application Ser. No. 15/595,712, filed May 15, 2017, now U.S. Pat. No. 10,392,038, issued Aug. 27, 2019; U.S. Provisional Application No. 62/680,907, filed Jun. 5, 2018; and U.S. Non-provisional patent application Ser. No. 16/431,466, filed Jun. 4, 2019. The entire disclosures of each of the above are incorporated herein by reference. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

TECHNICAL FIELD

This disclosure relates to equipment used in high value assets and particularly, to an automated signal compliance monitoring and alerting system used in high value mobile assets.

BACKGROUND

High value mobile assets such as locomotives, aircraft, mass transit systems, mining equipment, transportable medical equipment, cargo, marine vessels, and military vessels typically employ onboard data acquisition and recording "black box" systems and/or "event recorder" systems. These data acquisition and recording systems, such as event data recorders or flight data recorders, log a variety of system parameters used for incident investigation, crew performance evaluation, fuel efficiency analysis, maintenance planning, and predictive diagnostics. A typical data acquisition and recording system comprises digital and analog inputs, as well as pressure switches and pressure transducers, which record data from various onboard sensor devices. Recorded data may include such parameters as speed, distance traveled, location, fuel level, engine revolution per minute (RPM), fluid levels, operator controls, pressures, current and forecasted weather conditions and ambient conditions. In addition to the basic event and operational data, video and audio event/data recording capabilities are also deployed on many of these same mobile assets. Typically, data is extracted from data recorders, after an incident has occurred involving an asset and investigation is required, once the data recorder has been recovered. Certain situations may arise where the data recorder cannot be recovered or the data is otherwise unavailable. In these situations, the data, such as event and operational data, video data, and audio data, acquired by the data acquisition and recording system is needed promptly regardless of whether physical access to the data acquisition and recording system or the data is available.

SUMMARY

This disclosure relates generally to real-time data acquisition and recording systems and automated signal monitoring and alerting systems used in high value mobile assets. The teachings herein can provide real-time, or near real-time, access to data, such as event and operational data, video data, and audio data, recorded by a real-time data acquisition and recording system on a high value mobile asset. One implementation a method for processing data from at least one mobile asset that includes the steps of: receiving, using one of a data center remote from the at least one mobile asset and a data center onboard the at least one mobile asset, data based on at least one data signal from at least one of: at least one data source onboard the at least one mobile asset; and at least one data source remote from the at least one mobile asset; determining, using a first artificial intelligence model of the data center, that the at least one mobile asset is at least one of a leading mobile asset and a controlling mobile asset on a condition that at least one trigger condition was detected, using the data center, based on the data; obtaining, using the data center, video content from at least one of the leading mobile asset and the controlling mobile asset, the video content comprising a configurable predetermined amount of the data collected a configurable predetermined amount of time prior to the at least one trigger condition; storing, using a database of the data center, the video content; determining, using a second artificial intelligence model of the data center, an episode based on the video content; storing, using the database of the data center, the episode; and sending, using the data center, an electronic message to a predetermined amount of users.

One implementation of a system for processing data from at least one mobile asset that includes: at least one of at least one image measuring device, at least one video measuring device, at least one range measuring device, and at least one microphone; a data recorder onboard the at least one mobile asset adapted to receive at least one data signal from at least one of the at least one of at least one image measuring device, the at least one video measuring device, the at least one range measuring device, the at least one microphone, at least one data source onboard the at least one mobile asset, and at least one data source remote from the at least one mobile asset; a data center adapted to receive data based on the at least one data signal; a first artificial intelligence model of the data center, the first artificial intelligence model adapted to determine that the at least one mobile asset is at least one of a leading mobile asset and a controlling mobile asset on a condition that at least one trigger condition was detected by the data center based on the data; a database of the data center, the database adapted to store video content obtained from at least one of the at least one image measuring device, the at least one video measuring device, the at least one range measuring device, the at least one microphone, the at least one data source onboard the at least one mobile asset, and the at least one data source remote from the at least one mobile asset; and a second artificial intelligence model of the data center, the second artificial intelligence model adapted to determine an episode based on the video content.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein:

FIG. 5 is a diagram that illustrates exemplary interim record blocks and full record blocks saved to a crash hardened memory module in accordance with implementations of this disclosure;

FIG. 7 is a diagram that illustrates an exemplary record segment in the crash hardened memory module after power has been restored in accordance with implementations of this disclosure;

FIG. 17 is a flow diagram of a process for determining an internal status of the mobile asset in accordance with implementations of this disclosure;

FIG. 18 is a flow diagram of a process for determining object detection and obstruction detection occurring externally to the mobile asset in accordance with implementations of this disclosure;

DETAILED DESCRIPTION

Figure 1:
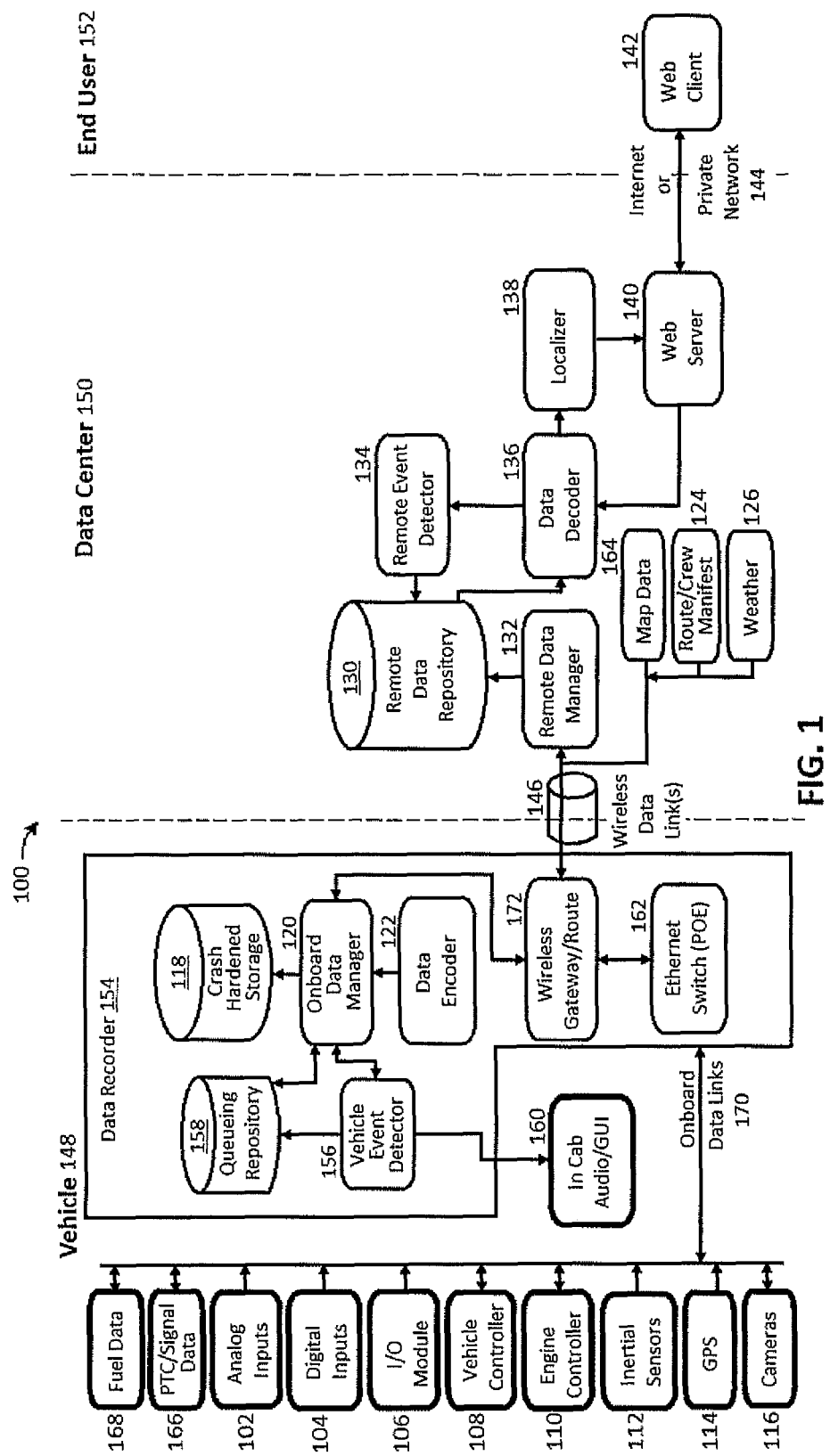
FIG. 1 illustrates a field implementation of a first embodiment of an exemplary real-time data acquisition and recording system in accordance with implementations of this disclosure.

A first embodiment of a real-time data acquisition and recording system described herein provides real-time, or near real-time, access to a wide range of data, such as event and operational data, video data, and audio data, related to a high value asset to remotely located users such as asset owners, operators and investigators. The data acquisition and recording system records data, via a data recorder, relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data recorder on the asset to request a download of specific data, to locate and transfer files, and to use a custom application to view the data. The system of the present disclosure retains typical recording capability and adds the ability to stream data to a remote data repository and remote end user prior to, during, and after an incident. In the vast majority of situations, the information recorded in the data recorder is redundant and not required as data has already been acquired and stored in the remote data repository.

Prior to the system of the present disclosure, data was extracted from the "black box" or "event recorder" after an incident had occurred and an investigation was required. Data files containing time segments recorded by the "black box" had to be downloaded and retrieved from the "black box" and then viewed by a user with proprietary software. The user would have to obtain physical or remote access to the asset, select the desired data to be downloaded from the "black box," download the file containing the desired information to a computing device, and locate the appropriate file with the desired data using a custom application that operates on the computing device. The system of the present disclosure has eliminated the need for the user to perform these steps, only requiring the user to use a common web browser to navigate to the desired data. The remotely located user may access a common web browser to navigate to desired data relating to a selected asset to view and analyze the operational efficiency and safety of assets in real-time or near real-time.

The remotely located user, such as an asset owner, operator, and/or investigator, may access a common web browser to navigate to live and/or historic desired data relating to a selected asset to view and analyze the operational efficiency and safety of assets in real-time or near real-time. The ability to view operations in real-time, or near real-time, enables rapid evaluation and adjustment of behavior. During an incident, for example, real-time information and/or data can facilitate triaging the situation and provide valuable information to first responders. During normal operation, for example, real-time information and/or data can be used to audit crew performance and to aid network wide situational awareness.

Data may include, but is not limited to, analog and frequency parameters such as speed, pressure, temperature, current, voltage, and acceleration which originate from the asset and/or nearby assets, Boolean data such as switch positions, actuator position, warning light illumination, and actuator commands, global positioning system (GPS) data and/or geographic information system (GIS) data such as position, speed, and altitude, internally generated information such as the regulatory speed limit for an asset given its current position, video and image information from cameras located at various locations in, on or in the vicinity of the asset, audio information from microphones located at various locations in, on or in vicinity of the asset, information about the operational plan for the asset that is sent to the asset from a data center such as route, schedule, and cargo manifest information, information about the environmental conditions, including current and forecasted weather conditions, of the area in which the asset is currently operating in or is planned to operate in, asset control status and operational data generated by systems such as positive train control (PTC) in locomotives, and data derived from a combination from any of the above including, but not limited to, additional data, video, and audio analysis and analytics.

Figure 2:
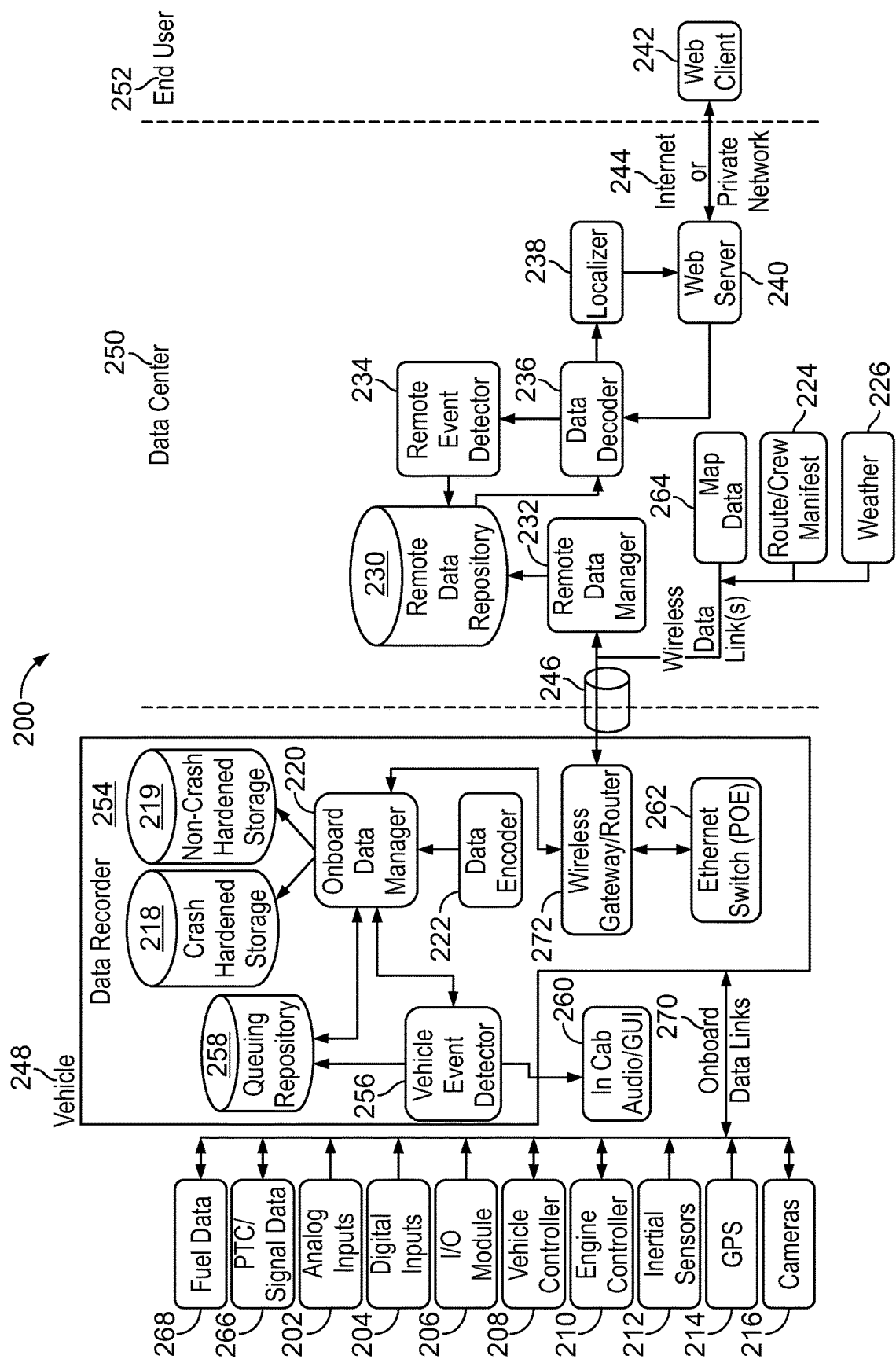
FIG. 2 illustrates a field implementation of a second embodiment of the exemplary real-time data acquisition and recording system in accordance with implementations of this disclosure.

FIGS. 1 and 2 illustrate a field implementation of a first embodiment and a second embodiment, respectively, of an exemplary real-time data acquisition and recording system (DARS) 100, 200 in which aspects of the disclosure can be implemented. DARS 100, 200 is a system that delivers real time information to remotely located end users from a data recording device. DARS 100, 200 includes a data recorder 154, 254 that is installed on a vehicle or mobile asset 148, 248 and communicates with any number of various information sources through any combination of onboard wired and/or wireless data links 170, 270, such as a wireless gateway/router, or off board information sources via a data center 150, 250 of DARS 100, 200 via data links such as wireless data links 146. Data recorder 154, 254 comprises an onboard data manager 120, 220, a data encoder 122, 222, a vehicle event detector 156, 256, a queueing repository 158, 258, and a wireless gateway/router 172, 272. Additionally, in this implementation, data recorder 154, 254 can include a crash hardened memory module 118, 218 and/or an Ethernet switch 162, 262 with or without power over Ethernet (POE). An exemplary hardened memory module 118, 218 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Administration regulations, a crash hardened memory module in compliance with any applicable Code of Federal Regulations, or any other suitable hardened memory device as is known in the art. In the second embodiment, shown in FIG. 2, the data recorder 254 can further include an optional non-crash hardened removable storage device 219.

The wired and/or wireless data links 170, 270 can include any one of or combination of discrete signal inputs, standard or proprietary Ethernet, serial connections, and wireless connections. Ethernet connected devices may utilize the data recorder's 154, 254 Ethernet switch 162, 262 and can utilize POE. Ethernet switch 162, 262 may be internal or external and may support POE. Additionally, data from remote data sources, such as a map component 164, 264, a route/crew manifest component 124, 224, and a weather component 126, 226 in the implementation of FIGS. 1 and 2, is available to the onboard data manager 120, 220 and the vehicle event detector 156, 256 from the data center 150, 250 through the wireless data link 146, 246 and the wireless gateway/router 172, 272.

Data recorder 154, 254 gathers data or information from a wide variety of sources, which can vary widely based on the asset's configuration, through onboard data links 170, 270. The data encoder 122, 222 encodes at least a minimum set of data that is typically defined by a regulatory agency. In this implementation, the data encoder 122, 222 receives data from a wide variety of asset 148, 248 sources and data center 150, 250 sources. Information sources can include any number of components in the asset 148, 248, such as any of analog inputs 102, 202, digital inputs 104, 204, I/O module 106, 206, vehicle controller 108, 208, engine controller 110, 210, inertial sensors 112, 212, global positioning system (GPS) 114, 214, cameras 116, 216, positive train control (PTC)/signal data 166, 266, fuel data 168, 268, cellular transmission detectors (not shown), internally driven data and any additional data signals, and any of number of components in the data center 150, 250, such as any of the route/crew manifest component 124, 224, the weather component 126, 226, the map component 164, 264, and any additional data signals. The data encoder 122, 222 compresses or encodes the data and time synchronizes the data in order to facilitate efficient real-time transmission and replication to a remote data repository 130, 230. The data encoder 122, 222 transmits the encoded data to the onboard data manager 120, 220 which then saves the encoded data in the crash hardened memory module 118, 218 and the queuing repository 158, 258 for replication to the remote data repository 130, 230 via a remote data manager 132, 232 located in the data center 150, 250. Optionally, the onboard data manager 120, 220 can save a tertiary copy of the encoded data in the non-crash hardened removable storage device 219 of the second embodiment shown in FIG. 2. The onboard data manager 120, 220 and the remote data manager 132, 232 work in unison to manage the data replication process. A single remote data manager 132, 232 in the data center 150, 250 can manage the replication of data from a plurality of assets 148, 248.

The data from the various input components and data from an in-cab audio/graphic user interface (GUI) 160, 260 are sent to a vehicle event detector 156, 256. The vehicle event detector 156, 256 processes the data to determine whether an event, incident or other predefined situation involving the asset 148, 248 has occurred. When the vehicle event detector 156, 256 detects signals that indicate a predefined event occurred, the vehicle event detector 156, 256 sends the processed data that a predefined event occurred along with supporting data surrounding the predefined event to the onboard data manager 120, 220. The vehicle event detector 156, 256 detects events based on data from a wide variety of sources, such as the analog inputs 102, 202, the digital inputs 104, 204, the I/O module 106, 206, the vehicle controller 108, 208, the engine controller 110, 210, the inertial sensors 112, 212, the GPS 114, 214, the cameras 116, 216, the route/crew manifest component 124, 224, the weather component 126, 226, the map component 164, 264, the PTC/signal data 166, 266, and the fuel data 168, 268, which can vary based on the asset's configuration. When the vehicle event detector 156, 256 detects an event, the detected asset event information is stored in a queuing repository 158, 258 and can optionally be presented to the crew of the asset 148, 248 via the in-cab audio/graphical user interface (GUI) 160, 260.

The onboard data manager 120, 220 also sends data to the queuing repository 158. In near real-time mode, the onboard data manager 120, 220 stores the encoded data received from the data encoder 122, 222 and any event information in the crash hardened memory module 118, 218 and in the queueing repository 158, 258. In the second embodiment of FIG. 2, the onboard data manager 220 can optionally store the encoded data in the non-crash hardened removable storage device 219. After five minutes of encoded data has accumulated in the queueing repository 158, 258, the onboard data manager 120, 220 stores the five minutes of encoded data to the remote data repository 130, 230 via the remote data manager 132, 232 in the data center 150, 250 over the wireless data link 146, 246 accessed through the wireless gateway/router 172, 272. In real-time mode, the onboard data manager 120, 220 stores the encoded data received from the data encoder 122, 222 and any event information to the crash hardened memory module 118, 218, and optionally in the non-crash hardened removable storage device 219 of FIG. 2, and to the remote data repository 130, 230 via the remote data manager 132, 232 in the data center 150, 250 over the wireless data link 146, 246 accessed through the wireless gateway/router 172, 272. The onboard data manager 120, 220 and the remote data manager 132, 232 can communicate over a variety of wireless communications links, such as Wi-Fi, cellular, satellite, and private wireless systems utilizing the wireless gateway/router 172, 272. Wireless data link 146, 246 can be, for example, a wireless local area network (WLAN), wireless metropolitan area network (WMAN), wireless wide area network (WWAN), a private wireless system, a cellular telephone network or any other means of transferring data from the data recorder 154, 254 of DARS 100, 200 to, in this example, the remote data manager 130, 230 of DARS 100, 200. When a wireless data connection is not available, the data is stored in memory and queued in queueing repository 158, 258 until wireless connectivity is restored and the data replication process can resume.

In parallel with data recording, data recorder 154, 254 continuously and autonomously replicates data to the remote data repository 130, 230. The replication process has two modes, a real-time mode and a near real-time mode. In real-time mode, the data is replicated to the remote data repository 130, 230 every second. In near real-time mode, the data is replicated to the remote data repository 130, 230 every five minutes. The rate used for near real-time mode is configurable and the rate used for real-time mode can be adjusted to support high resolution data by replicating data to the remote data repository 130, 230 every 0.10 seconds. When the DARS 100, 200 is in near real-time mode, the onboard data manager 120, 220 queues data in the queuing repository 158, 258 before replicating the data to the remote data manager 132, 232. The onboard data manager 120, 220 also replicates the vehicle event detector information queued in the queueing repository 158, 258 to the remote data manager 132, 232. Near real-time mode is used during normal operation, under most conditions, in order to improve the efficiency of the data replication process.

Real-time mode can be initiated based on events occurring and detected by the vehicle event detector 156, 256 onboard the asset 148, 248 or by a request initiated from the data center 150, 250. A typical data center 150, 250 initiated request for real-time mode is initiated when a remotely located user 152, 252 has requested real-time information from a web client 142, 242. A typical reason for real-time mode to originate onboard the asset 148, 248 is the detection of an event or incident by the vehicle event detector 156, 256 such as an operator initiating an emergency stop request, emergency braking activity, rapid acceleration or deceleration in any axis, or loss of input power to the data recorder 154, 254. When transitioning from near real-time mode to real-time mode, all data not yet replicated to the remote data repository 130, 230 is replicated and stored in the remote data repository 130, 230 and then live replication is initiated. The transition between near real-time mode and real-time mode typically occurs in less than five seconds. After a predetermined amount of time has passed since the event or incident, a predetermined amount of time of inactivity, or when the user 152, 252 no longer desires real-time information from the asset 148, 248, the data recorder 154, 254 reverts to near real-time mode. The predetermined amount of time required to initiate the transition is configurable and is typically set to ten minutes.

When the data recorder 154, 254 is in real-time mode, the onboard data manager 120, 220 attempts to continuously empty its queue to the remote data manager 132, 232, storing the data to the crash hardened memory module 118, 218, and optionally to the non-crash hardened removable storage device 219 of FIG. 2, and sending the data to the remote data manager 132, 232 simultaneously. The onboard data manager 120, 220 also sends the detected vehicle information queued in the queueing repository 158, 258 to the remote data manager 132, 232.

Upon receiving data to be replicated from the data recorder 154, 254, along with data from the map component 164, 264, the route/crew manifest component 124, 224, and the weather component 126, 226, the remote data manager 132, 232 stores the compressed data to the remote data repository 130, 230 in the data center 150, 250 of DARS 100, 200. The remote data repository 130, 230 can be, for example, cloud-based data storage or any other suitable remote data storage. When data is received, a process is initiated that causes a data decoder 136, 236 to decode the recently replicated data for/from the remote data repository 130, 230 and send the decoded data to a remote event detector 134, 234. The remote data manager 132, 232 stores vehicle event information in the remote data repository 130, 230. When the remote event detector 134, 234 receives the decoded data, it processes the decoded data to determine if an event of interest is found in the decoded data. The decoded information is then used by the remote event detector 134, 234 to detect events, incidents, or other predefined situations, in the data occurring with the asset 148, 248. Upon detecting an event of interest from the decoded data, the remote event detector 134, 234 stores the event information and supporting data in the remote data repository 130, 230. When the remote data manager 132, 232 receives remote event detector 134, 234 information, the remote data manager 132, 232 stores the information in the remote data repository 130, 230.

The remotely located user 152, 252 can access information, including vehicle event detector information, relating to the specific asset 148, 248, or a plurality of assets, using the standard web client 142, 242, such as a web browser, or a virtual reality device (not shown) which, in this implementation, can display thumbnail images from selected cameras. The web client 142, 242 communicates the user's 152, 252 requests for information to a web server 140, 240 through a network 144, 244 using common web standards, protocols, and techniques. Network 144, 244 can be, for example, the Internet. Network 144, 244 can also be a local area network (LAN), metropolitan area network (MAN), wide area network (WAN), virtual private network (VPN), a cellular telephone network or any other means of transferring data from the web server 140, 240 to, in this example, the web client 142, 242. The web server 140, 240 requests the desired data from the data decoder 136, 236. The data decoder 136, 236 obtains the requested data relating to the specific asset 148, 248, or a plurality of assets, from the remote data repository 130, 230 upon request from the web server 140, 240. The data decoder 136, 236 decodes the requested data and sends the decoded data to a localizer 138, 238. Localization is the process of converting data to formats desired by the end user, such as converting the data to the user's preferred language and units of measure. The localizer 138, 238 identifies the profile settings set by user 152, 252 by accessing the web client 142, 242 and uses the profile settings to prepare the information being sent to the web client 142, 242 for presentation to the user 152, 252, as the raw encoded data and detected event information is saved to the remote data repository 130, 230 using coordinated universal time (UTC) and international system of units (SI units). The localizer 138, 238 converts the decoded data into a format desired by the user 152, 252, such as the user's 152, 252 preferred language and units of measure. The localizer 138, 238 sends the localized data in the user's 152, 252 preferred format to the web server 140, 240 as requested. The web server 140, 240 then sends the localized data of the asset, or plurality of assets, to the web client 142, 242 for viewing and analysis, providing playback and real-time display of standard video and 360 degrees video. The web client 142, 242 can display and the user 152, 252 can view the data, video, and audio for a single asset or simultaneously view the data, video, and audio for a plurality of assets. The web client 142, 242 can also provide synchronous playback and real-time display of data along with the plurality of video and audio data from both standard and 360 degrees video sources on, in, or in the vicinity of the asset, nearby assets, and/or remotely located sites.

Figure 3:
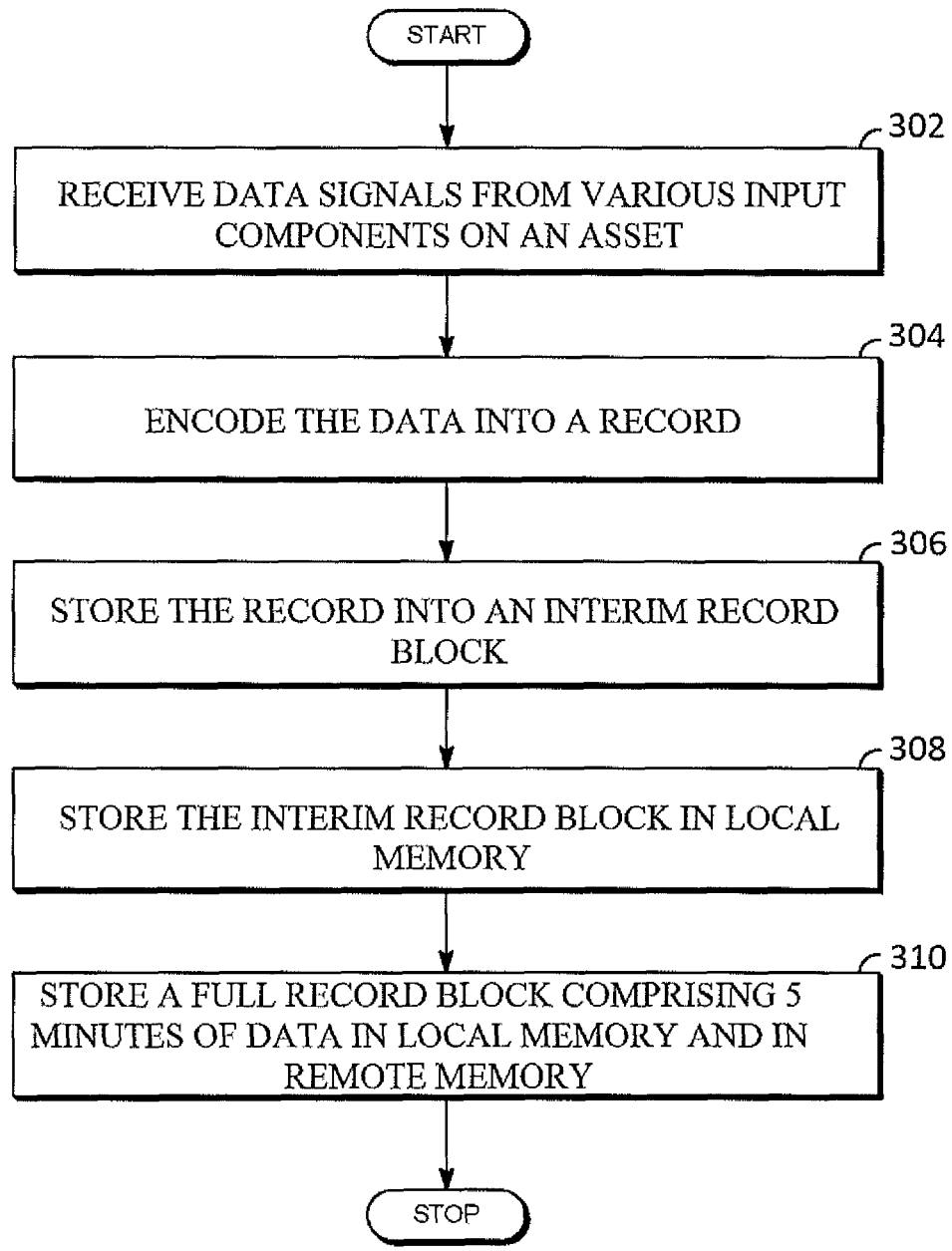
FIG. 3 is a flow diagram of a process for recording data and/or information from a mobile asset in accordance with implementations of this disclosure.

FIG. 3 is a flow diagram showing a process 300 for recording data and/or information from the asset 148, 248 in accordance with an implementation of this disclosure. Data recorder 154, 254 receives data signals from various input components that include physical or calculated data elements from the asset 148, 248 and data center 150, 250, such as speed, latitude coordinates, longitude coordinates, horn detection, throttle position, weather data, map data, or crew data 302. Data encoder 122, 222 creates a record that includes a structured series of bits used to configure and record the data signal information 304. The encoded record is then sent to the onboard data manager 120, 220 that sequentially combines a series of records in chronological order into record blocks that include up to five minutes of data 306. An interim record block includes less than five minutes of data while a full record block includes a full five minutes of data. Each record block includes all the data required to fully decode the included signals, including a data integrity check. At a minimum, a record block must start with a start record and end with an end record.

In order to ensure that all of the encoded signal data is saved to the crash hardened memory module 118, and optionally to the non-crash hardened removable storage device 219 of FIG. 2, should the data recorder 154, 254 lose power or be subjected to extreme temperatures or mechanical stresses due to a collision or other catastrophic event, the onboard data manager 120, 220 stores interim record blocks in the crash hardened memory module 118 at a predetermined rate 308, and optionally in the non-crash hardened removable storage device 219 of FIG. 2, where the predetermined rate is configurable and/or variable, as shown in FIG. 5 in an exemplary representation. Interim record blocks are saved at least once per second but can also be saved as frequently as once every tenth of a second. The rate at which interim record blocks are saved depends on the sampling rates of each signal. Every interim record block includes the full set of records since the last full record block. Data recorder 154, 254 can alternate between two temporary storage locations in the crash hardened memory module 118, 218, and optionally in the non-crash hardened removable storage device 219 of FIG. 2, when recording each interim record block to prevent the corruption or loss of more than one second of data when the data recorder 154, 254 loses power while storing data to the crash hardened memory module 118, 218 or the optional non-crash hardened removable storage device 219 of the data recorder 254 of FIG. 2. Each time a new interim record block is saved to a temporary crash hardened memory location it will overwrite the existing previously stored interim record block in that location.

Every five minutes, in this implementation, when the data recorder 154, 254 is in near real-time mode, the onboard data manager 120, 220 stores a full record block including the last five minutes of encoded signal data into a record segment in the crash hardened memory module 118, 218, shown in FIG. 7, and sends a copy of the full record block to the remote data manager 132, 232 to be stored in the remote data repository 130, 230 for a predetermined retention period such as two years 310. The crash hardened memory module 118, 218, and/or the optional non-crash hardened removable storage device 219 of the data recorder 254 of FIG. 2, stores a record segment of the most recent record blocks for a mandated storage duration, which in this implementation is the federally mandated duration that the data recorder 154, 254 must store operational or video data in the crash hardened memory module 118, 218 with an additional 24 hour buffer, and is then overwritten.

Figure 4:
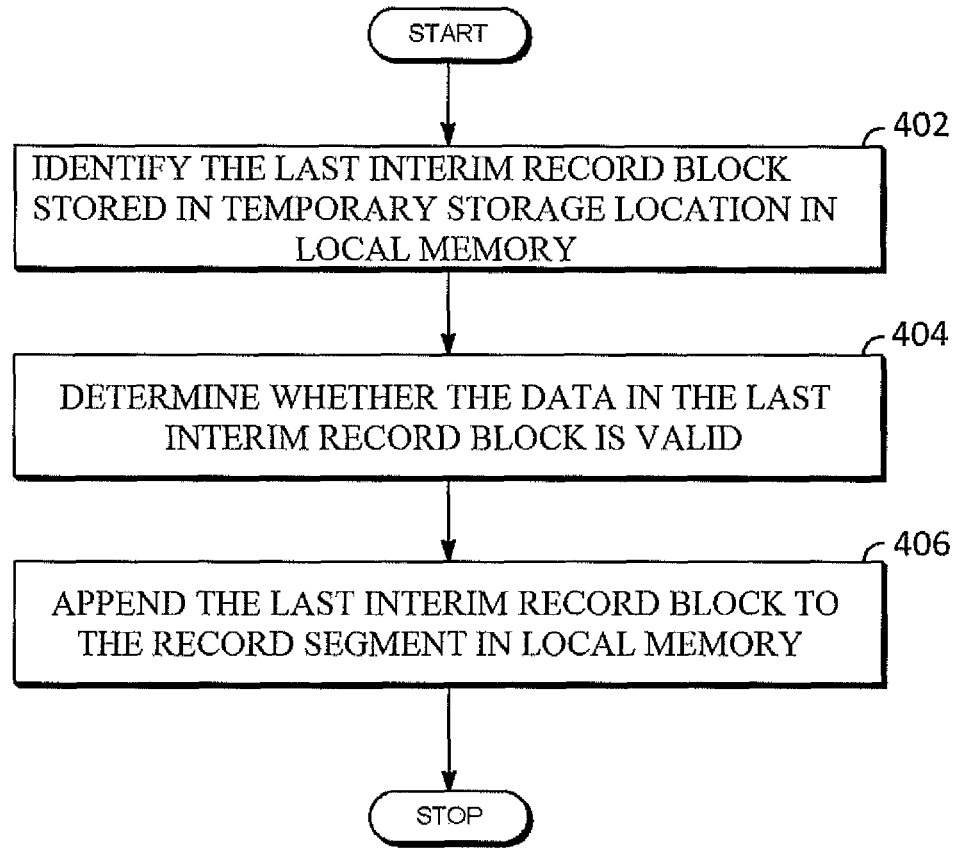
FIG. 4 is a flow diagram of a process for appending data and/or information from the mobile asset after a power outage in accordance with implementations of this disclosure.

FIG. 4 is a flow diagram showing a process 400 for appending data and/or information from the asset 148, 248 after a power outage in accordance with an implementation of this disclosure. Once power is restored, the data recorder 154, 254 identifies the last interim record block that was stored in one of the two temporary crash hardened memory locations 402 and validates the last interim record block using the 32 bit cyclic redundancy check that is included in the end record of every record block 404. The validated interim record block is then appended to the crash hardened memory record segment and that record segment, which can contain up to five minutes of data prior to the power loss, is sent to the remote data manager 132, 232 to be stored for the retention period 406. The encoded signal data is stored to the crash hardened memory module 118, 218, and/or the optional non-crash hardened removable storage device 219 of the data recorder 254 of FIG. 2, in a circular buffer of the mandated storage duration. Since the crash hardened memory record segment is broken up into multiple record blocks, the data recorder 154, 254 removes older record blocks when necessary to free up memory space each time a full record block is saved to crash hardened memory module 118, 218, and/or the optional non-crash hardened removable storage device 219 of the data recorder 254 of FIG. 2.

Figure 6:
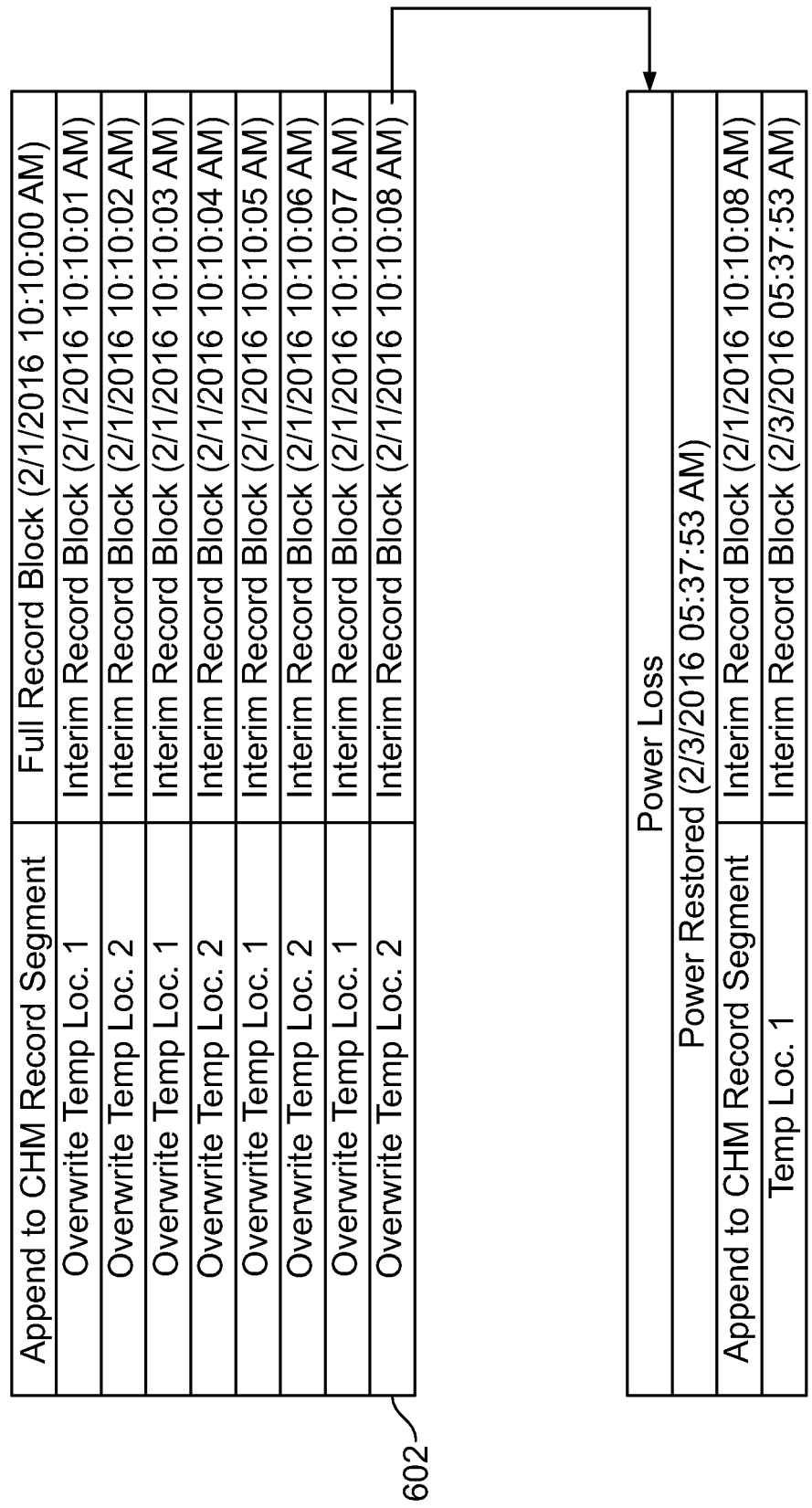
FIG. 6 is a diagram that illustrates exemplary interim record blocks in the crash hardened memory module prior to a power outage and after restoration of power in accordance with implementations of this disclosure.

FIG. 6 is a diagram that illustrates exemplary interim record blocks prior to a loss of power and after restoration of power to the data recorder 154, 254. When the interim record block stored in temporary location 2 at (Feb. 1, 2016 10:10:08 AM) 602 is valid, that interim record block is appended to the record segment 702 (FIG. 7) in the crash hardened memory module 118, 218, and/or the optional non-crash hardened removable storage device 219 of the data recorder 254 of FIG. 2, as shown in FIG. 7. When the interim record block stored in temporary location 2 at (Feb. 1, 2016 10:10:08 AM) is not valid, the interim record block in temporary location 1 at (Feb. 1, 2016 10:10:07 AM) is validated and, if valid, is appended to the record segment in the crash hardened memory module 118, 218, and/or the optional non-crash hardened removable storage device 219 of the data recorder 254 of FIG. 2.

Whenever any record block needs to be saved in crash hardened memory module 118, 218, and/or the optional non-crash hardened removable storage device 219 of the data recorder 254 of FIG. 2, the record segment is flushed to the disk immediately. Since the data recorder 154, 254 alternates between two different temporary storage locations when saving interim record blocks, there is always one temporary storage location that is not being modified or flushed to crash hardened memory or non-crash hardened removable storage device, thereby ensuring that at least one of the two interim record blocks stored in the temporary storage locations is valid and that the data recorder 154, 254 will not lose more than one second at most of data whenever the data recorder 154, 254 loses power. Similarly, when the data recorder 154, 254 is writing data to the crash hardened memory module 118, 218, and/or the optional non-crash hardened removable storage device 219 of the data recorder 254 of FIG. 2, every tenth of a second, the data recorder 154, 254 will not lose more than one tenth of a second at most of data whenever the data recorder 154, 254 loses power.

For simplicity of explanation, process 300 and process 400 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A third embodiment of a real-time data acquisition and recording system and viewer described herein provides real-time, or near real-time, access to a wide range of data, such as event and operational data, video data, and audio data, of a high value asset to remotely located users such as asset owners, operators and investigators. The data acquisition and recording system records data, via a data recorder, relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data recorder on the asset to request a download of specific data, to locate and transfer files, and to use a custom application to view the data. The system of the present disclosure retains typical recording capabilities and adds the ability to stream data to a remote data repository and remote end user prior to, during, and after an incident. In the vast majority of situations, the information recorded in the data recorder is redundant and not required as data has already been acquired and stored in the remote data repository.

Prior to the system of the present disclosure, data was extracted from the "black box" or "event recorder" after an incident had occurred and an investigation was required. Data files containing time segments recorded by the "black box" had to be downloaded and retrieved from the "black box" and then viewed by a user with proprietary software. The user would have to obtain physical or remote access to the asset, select the desired data to be downloaded from the "black box," download the file containing the desired information to a computing device, and locate the appropriate file with the desired data using a custom application that operates on the computing device. The system of the present disclosure has eliminated the need for the user to perform these steps, only requiring the user to use a common web browser to navigate to the desired data. The remotely located user may access a common web browser to navigate to desired data relating to a selected asset to view and analyze the operational efficiency and safety of assets in real-time or near real-time.

The remotely located user, such as an asset owner, operator, and/or investigator, may access a common web browser to navigate to live and/or historic desired data relating to a selected asset to view and analyze the operational efficiency and safety of assets in real-time or near real-time. The ability to view operations in real-time, or near real-time, enables rapid evaluation and adjustment of behavior. During an incident, for example, real-time information and/or data can facilitate triaging the situation and provide valuable information to first responders. During normal operation, for example, real-time information and/or data can be used to audit crew performance and to aid network wide situational awareness.

The real-time data acquisition and recording system of the third embodiment uses at least one of, or any combination of, an image measuring device, a video measuring device, and a range measuring device in, on, or in the vicinity of a mobile asset as part of a data acquisition and recording system. Image measuring devices and/or video measuring devices include, but are not limited to, 360 degrees cameras, fixed cameras, narrow view cameras, wide view cameras, 360 degrees fisheye view cameras, and/or other cameras. Range measuring devices include, but are not limited to, radar and light detection and ranging ("LIDAR"). LIDAR is a surveying method that measures distance to a target by illuminating the target with pulsed laser light and measuring the reflected pulses with a sensor. Prior to the system of the present disclosure, "black box" and/or "event recorders" did not include 360 degrees cameras or other cameras in, on, or in the vicinity of the mobile asset. The system of the present disclosure adds the ability to use and record videos using 360 degrees cameras, fixed cameras, narrow view cameras, wide view cameras, 360 degrees fisheye view cameras, radar, LIDAR, and/or other cameras as part of the data acquisition and recording system, providing 360 degrees views, narrow views, wide views, fisheye views, and/or other views in, on, or in the vicinity of the mobile asset to a remote data repository and a remote user and investigators prior to, during, and after an incident involving the mobile asset has occurred. The ability to view operations, 360 degrees video, and/or other videos in real-time, or near real-time, enables rapid evaluation and adjustment of crew behavior. Owners, operators, and investigators can view and analyze the operational efficiency, safety of people, vehicles, and infrastructures and can investigate or inspect an incident. The ability to view 360 degrees video and/or other videos from the mobile asset enables rapid evaluation and adjustment of crew behavior. During an incident, for example, 360 degrees video and/or other videos can facilitate triaging the situation and provide valuable information to first responders and investigators. During normal operation, for example, 360 degrees video and/or other videos can be used to audit crew performance and to aid network wide situational awareness. The 360 degrees cameras, fixed cameras, narrow view cameras, wide view cameras, 360 degrees fisheye view cameras, radar, LIDAR and/or other cameras provide a complete picture for situations to provide surveillance video for law enforcement and/or rail police, inspection of critical infrastructure, monitoring of railroad crossings, view track work progress, crew auditing both inside the cab and in the yard, and real-time remote surveillance.

Prior systems required users to download video files containing time segments in order to view the video files using a proprietary software application or other external video playback applications. The data acquisition and recording system of the present disclosure provides 360 degrees video, other video, image information and audio information, and range measuring information that can be displayed to a remote user through the use of a virtual reality device and/or through a standard web client, thereby eliminating the need to download and use external applications to watch the videos. Additionally, remotely located users can view 360 degrees videos and/or other videos in various modes through the use of a virtual reality device or through a standard web client, such as a web browser, thereby eliminating the need to download and use external applications to watch the video. Prior video systems required the user to download video files containing time segments of data that were only viewable using proprietary application software or other external video playback applications which the user had to purchase separately.

Data may include, but is not limited to, video and image information from cameras located at various locations in, on or in the vicinity of the asset and audio information from microphones located at various locations in, on or in vicinity of the asset. A 360 degrees camera is a camera that provides a 360 degrees spherical field of view, a 360 degrees hemispherical field of view, and/or 360 degrees fish eye field of view. Using 360 degrees cameras, fixed cameras, narrow view cameras, wide view cameras, 360 degrees fisheye view cameras, and/or other cameras in, on or in the vicinity of an asset provides the ability to use and record video using the 360 degrees cameras, fixed cameras, narrow view cameras, wide view cameras, 360 degrees fisheye view cameras, and/or other cameras as part of DARS, thereby making the 360 degrees view and/or other views in, on or in the vicinity of the asset available to a remote data repository, remotely located users, and investigators prior to, during and after an incident.

Figure 8:
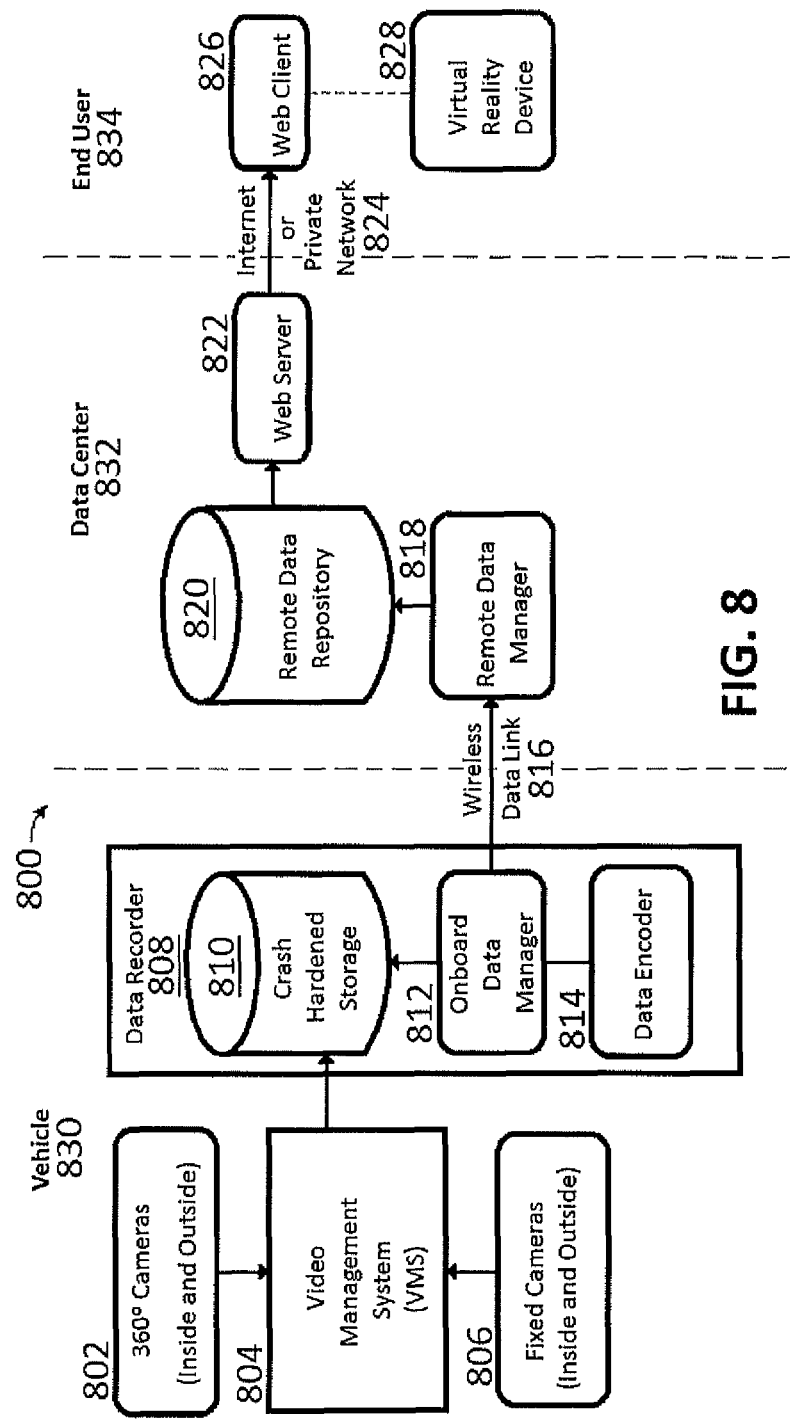
FIG. 8 illustrates a field implementation of a first embodiment of a real-time data acquisition and recording system viewer in accordance with implementations of this disclosure.

FIG. 8 illustrates a field implementation of a third embodiment of an exemplary real-time data acquisition and recording system (DARS) 800 in which aspects of the disclosure can be implemented. DARS 800 is a system that delivers real time information, video information, and audio information from a data recorder 808 on a mobile asset 830 to remotely located end users via a data center 832. The data recorder 808 is installed on the vehicle or mobile asset 830 and communicates with any number of various information sources through any combination of wired and/or wireless data links such as a wireless gateway/router (not shown). The data recorder 808 comprises a crash hardened memory module 810, an onboard data manager 812, and a data encoder 814. In a fourth embodiment, the data recorder 808 can also include a non-crash hardened removable storage device (not shown). An exemplary hardened memory module 810 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Administration regulations, a crash hardened memory module in compliance with any applicable Code of Federal Regulations, or any other suitable hardened memory device as is known in the art. The wired and/or wireless data links can include any one of or combination of discrete signal inputs, standard or proprietary Ethernet, serial connections, and wireless connections.

Data recorder 808 gathers video data, audio data, and other data and/or information from a wide variety of sources, which can vary based on the asset's configuration, through onboard data links. In this implementation, data recorder 808 receives data from a video management system 804 that continuously records video data and audio data from 360 degrees cameras, fixed cameras, narrow view cameras, wide view cameras, 360 degrees fisheye view cameras, radar, LIDAR, and/or other cameras 802 and fixed cameras 806 that are placed in, on or in the vicinity of the asset 830 and the video management system 804 stores the video and audio data to the crash hardened memory module 810, and can also store the video and audio data in the non-crash hardened removable storage device of the second embodiment. Different versions of the video data are created using different bitrates or spatial resolutions and these versions are separated into segments of variable length, such as thumbnails, five minute low resolution segments, and five minute high resolution segments.

The data encoder 814 encodes at least a minimum set of data that is typically defined by a regulatory agency. The data encoder 814 receives video and audio data from the video management system 804 and compresses or encodes the data and time synchronizes the data in order to facilitate efficient real-time transmission and replication to a remote data repository 820. The data encoder 814 transmits the encoded data to the onboard data manager 812 which then sends the encoded video and audio data to the remote data repository 820 via a remote data manager 818 located in the data center 830 in response to an on-demand request by a remotely located user 834 or in response to certain operating conditions being observed onboard the asset 830. The onboard data manager 812 and the remote data manager 818 work in unison to manage the data replication process. The remote data manager 818 in the data center 832 can manage the replication of data from a plurality of assets. The video and audio data stored in the remote data repository 820 is available to a web server 822 for the remote located user 834 to access.

The onboard data manager 812 also sends data to a queueing repository (not shown). The onboard data manager 812 monitors the video and audio data stored in the crash hardened memory module 810, and the optional non-crash hardened removable storage device of the second embodiment, by the video management system 804 and determines whether it is in near real-time mode or real-time mode. In near real-time mode, the onboard data manager 812 stores the encoded data, including video data, audio data, and any other data or information, received from the data encoder 814 and any event information in the crash hardened memory module 810, and the optional non-crash hardened removable storage device of the second embodiment, and in the queueing repository. After five minutes of encoded data has accumulated in the queueing repository, the onboard data manager 812 stores the five minutes of encoded data to the remote data repository 820 via the remote data manager 818 in the data center 832 through a wireless data link 816. In real-time mode, the onboard data manager 812 stores the encoded data, including video data, audio data, and any other data or information, received from the data encoder 814 and any event information to the remote data repository 820 via the remote data manager 818 in the data center 832 through the wireless data link 816. The onboard data manager 812 and the remote data manager 818 can communicate over a variety of wireless communications links. Wireless data link 816 can be, for example, a wireless local area network (WLAN), wireless metropolitan area network (WMAN), wireless wide area network (WWAN), a private wireless system, a cellular telephone network or any other means of transferring data from the data recorder 808 to, in this example, the remote data manager 818. The process of sending and retrieving video data and audio data remotely from the asset 830 requires a wireless data connection between the asset 830 and the data center 832. When a wireless data connection is not available, the data is stored and queued in the crash hardened memory module 810, and the optional non-crash hardened removable storage device of the fourth embodiment, until wireless connectivity is restored. The video, audio, and any other additional data retrieval process resumes as soon as wireless connectivity is restored.

In parallel with data recording, the data recorder 808 continuously and autonomously replicates data to the remote data repository 820. The replication process has two modes, a real-time mode and a near real-time mode. In real-time mode, the data is replicated to the remote data repository 820 every second. In near real-time mode, the data is replicated to the remote data repository 820 every five minutes. The rate used for near real-time mode is configurable and the rate used for real-time mode can be adjusted to support high resolution data by replicating data to the remote data repository 820 every 0.10 seconds. Near real-time mode is used during normal operation, under most conditions, in order to improve the efficiency of the data replication process.

Real-time mode can be initiated based on events occurring onboard the asset 830 or by a request initiated from the data center 832. A typical data center 832 initiated request for real-time mode is initiated when the remotely located user 834 has requested real-time information from a web client 826. A typical reason for real-time mode to originate onboard the asset 830 is the detection of an event or incident such as an operator initiating an emergency stop request, emergency braking activity, rapid acceleration or deceleration in any axis, or loss of input power to the data recorder 808. When transitioning from near real-time mode to real-time mode, all data not yet replicated to the remote data repository 820 is replicated and stored in the remote data repository 820 and then live replication is initiated. The transition between near real-time mode and real-time mode typically occurs in less than five seconds. After a predetermined amount of time has passed since the event or incident, a predetermined amount of time of inactivity, or when the user 834 no longer desires real-time information from the asset 830, the data recorder 808 reverts to near real-time mode. The predetermined amount of time required to initiate the transition is configurable and is typically set to ten minutes.

When the data recorder 808 is in real-time mode, the onboard data manager 812 attempts to continuously empty its queue to the remote data manager 818, storing the data to the crash hardened memory module 810, and the optional non-crash hardened removable storage device of the second embodiment, and sending the data to the remote data manager 818 simultaneously.

Upon receiving video data, audio data, and any other data or information to be replicated from the data recorder 808, the remote data manager 818 stores the data to the remote data repository 820 in the data center 830. The remote data repository 820 can be, for example, cloud-based data storage or any other suitable remote data storage. When data is received, a process is initiated that causes a data decoder (not shown) to decode the recently replicated data from the remote data repository 820 and send the decoded data to a remote event detector (not shown). The remote data manager 818 stores vehicle event information in the remote data repository 820. When the remote event detector receives the decoded data, it processes the decoded data to determine if an event of interest is found in the decoded data. The decoded information is then used by the remote event detector to detect events, incidents, or other predefined situations, in the data occurring with the asset 830. Upon detecting an event of interest from the decoded data previously stored in the remote data repository 820, the remote event detector stores the event information and supporting data in the remote data repository 820.

Video data, audio data, and any other data or information is available to the user 834 in response to an on-demand request by the user 834 and/or is sent by the onboard data manager 812 to the remote data repository 820 in response to certain operating conditions being observed onboard the asset 830. Video data, audio data, and any other data or information stored in the remote data repository 820 is available on the web server 822 for the user 834 to access. The remotely located user 834 can access the video data, audio data, and any other data or information relating to the specific asset 830, or a plurality of assets, stored in the remote data repository 820 using the standard web client 826, such as a web browser, or a virtual reality device 828 which, in this implementation, can display thumbnail images of selected cameras. The web client 826 communicates the user's 834 request for video, audio, and/or other information to the web server 822 through a network 824 using common web standards protocols, and techniques. Network 824 can be, for example, the Internet. Network 824 can also be a local area network (LAN), metropolitan area network (MAN), wide area network (WAN), virtual private network (VPN), a cellular telephone network or any other means of transferring data from the web server 822 to, in this example, the web client 826. The web server 822 requests the desired data from the remote data repository 820. The web server 822 then sends the requested data to the web client 826 that provides playback and real-time display of standard video, 360 degrees video, and/or other video. The web client 826 plays the video data, audio data, and any other data or information for the user 834 who can interact with the 360 degrees video data and/or other video data and/or still image data for viewing and analysis. The user 834 can also download the video data, audio data, and any other data or information using the web client 826 and can then use the virtual reality device 828 to interact with the 360 degrees video data for viewing and analysis.

Figure 11:
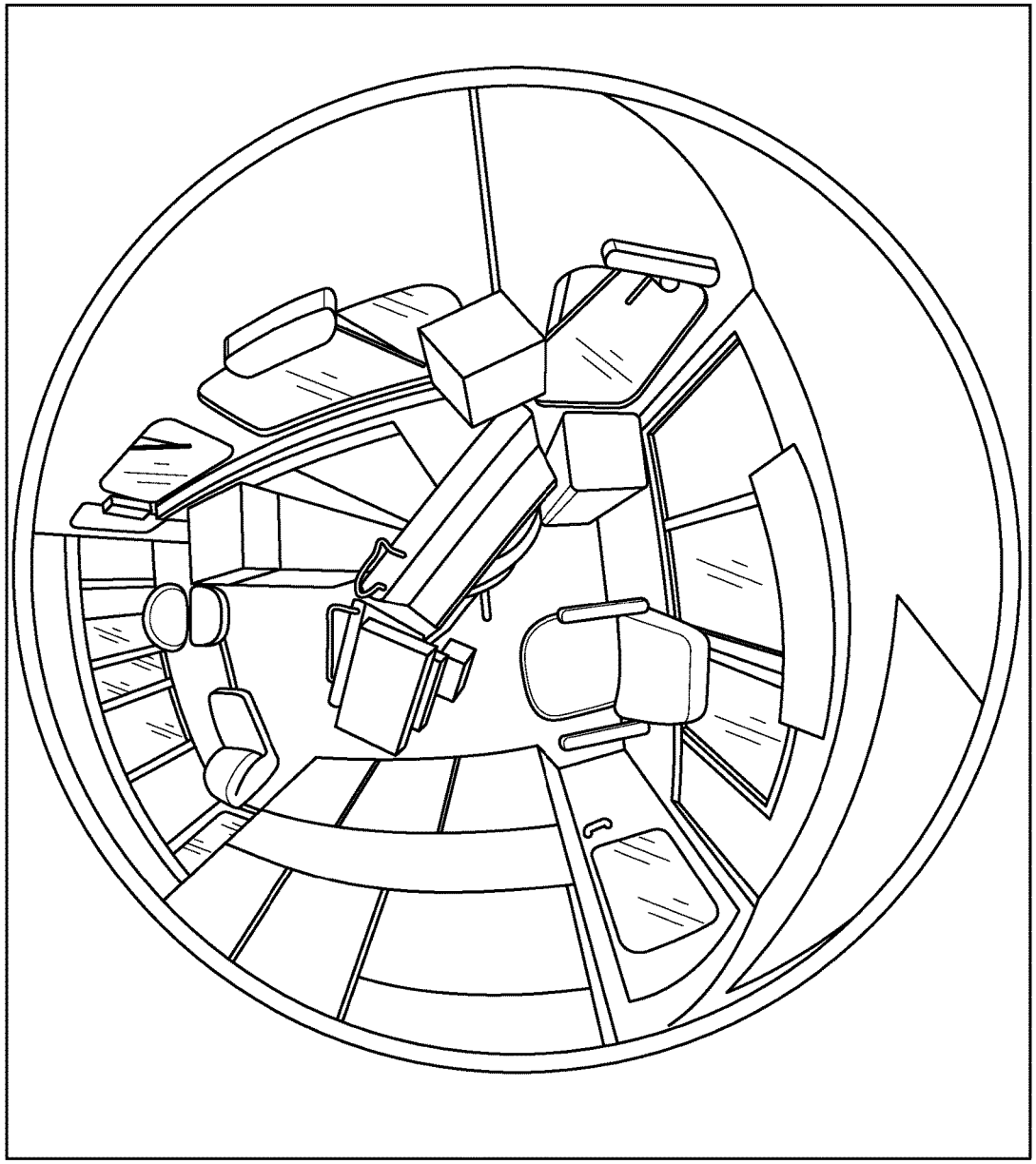
FIG. 11 is a flow diagram that illustrates an exemplary fisheye view of a 360 degrees camera of the real-time data acquisition and recording system viewer in accordance with implementations of this disclosure.
Figure 12:
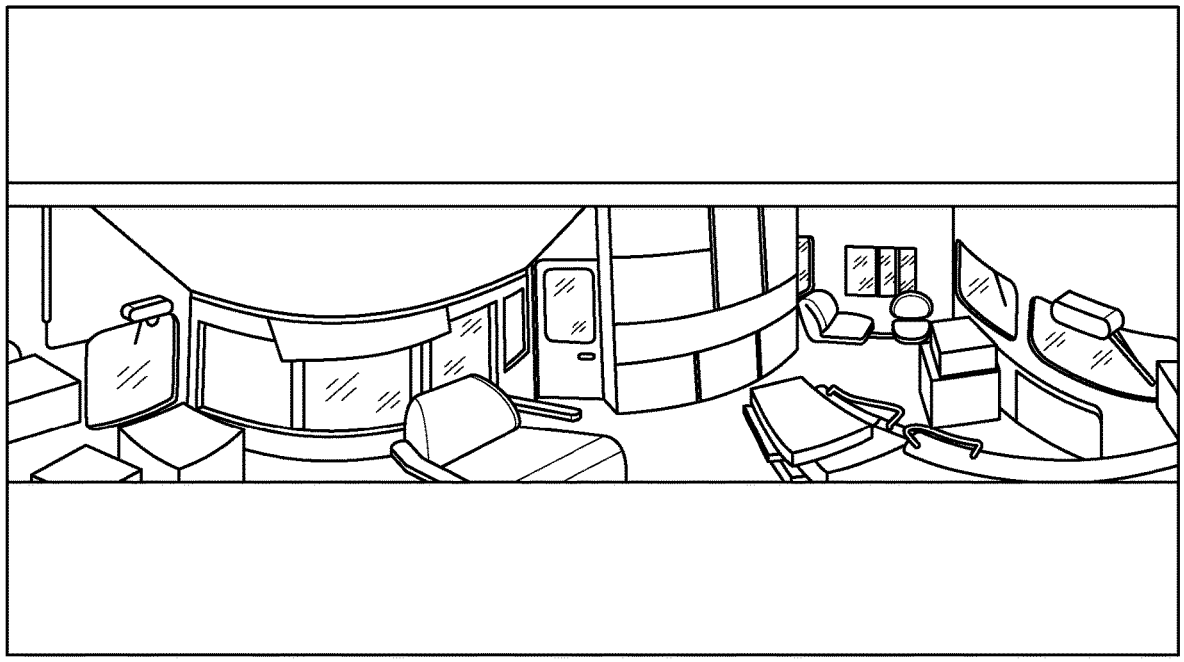
FIG. 12 is a diagram that illustrates an exemplary panorama view of the 360 degrees camera of the real-time data acquisition and recording system viewer in accordance with implementations of this disclosure.
Figure 13:
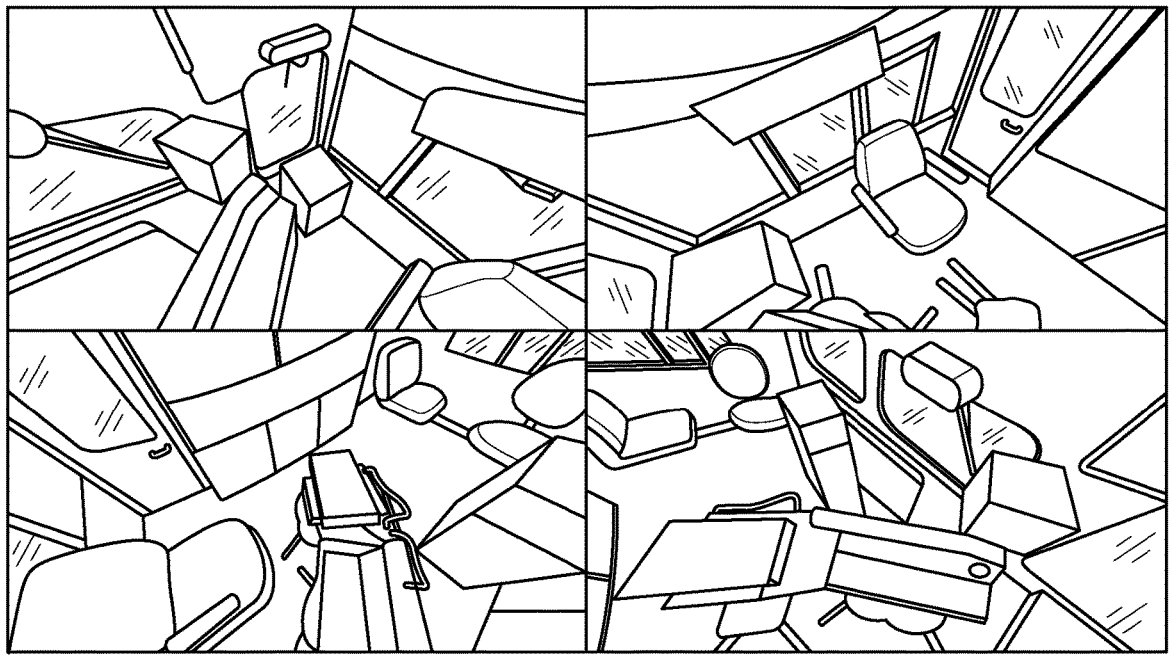
FIG. 13 is a diagram that illustrates an exemplary quad view of the 360 degrees camera of the real-time data acquisition and recording system viewer in accordance with implementations of this disclosure.
Figure 14:
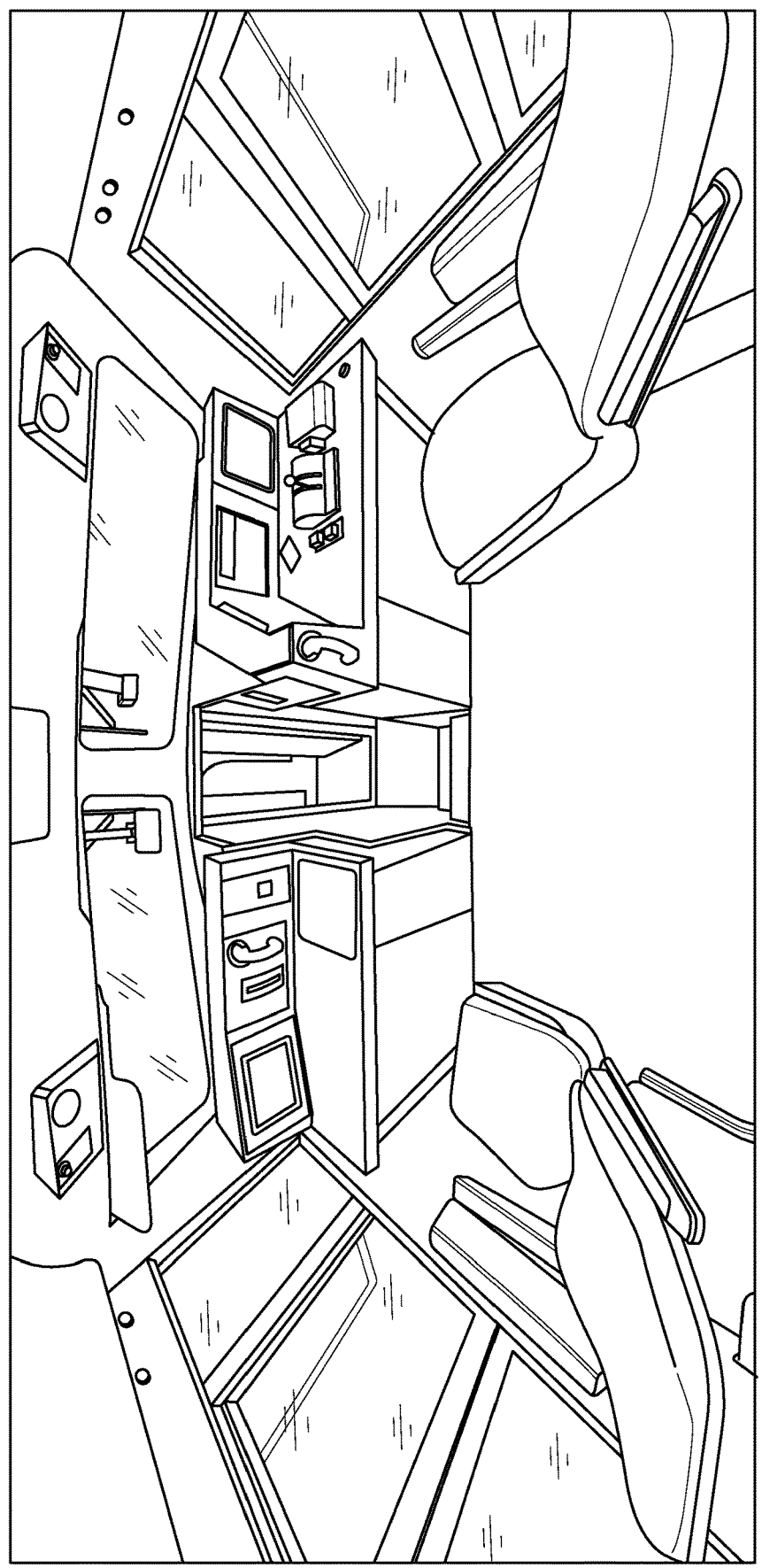
FIG. 14 is a diagram that illustrates an exemplary dewarped view of the 360 degrees camera of the real-time data acquisition and recording system viewer in accordance with implementations of this disclosure.

The web client 826 can be enhanced with a software application that provides the playback of 360 degrees video and/or other video in a variety of different modes. The user 834 can elect the mode in which the software application presents the video playback such as, for example, fisheye view as shown in FIG. 11, panorama view as shown in FIG. 12, double panorama view (not shown), quad view as shown in FIG. 13, and dewarped view as shown in FIG. 14.

Figure 9:
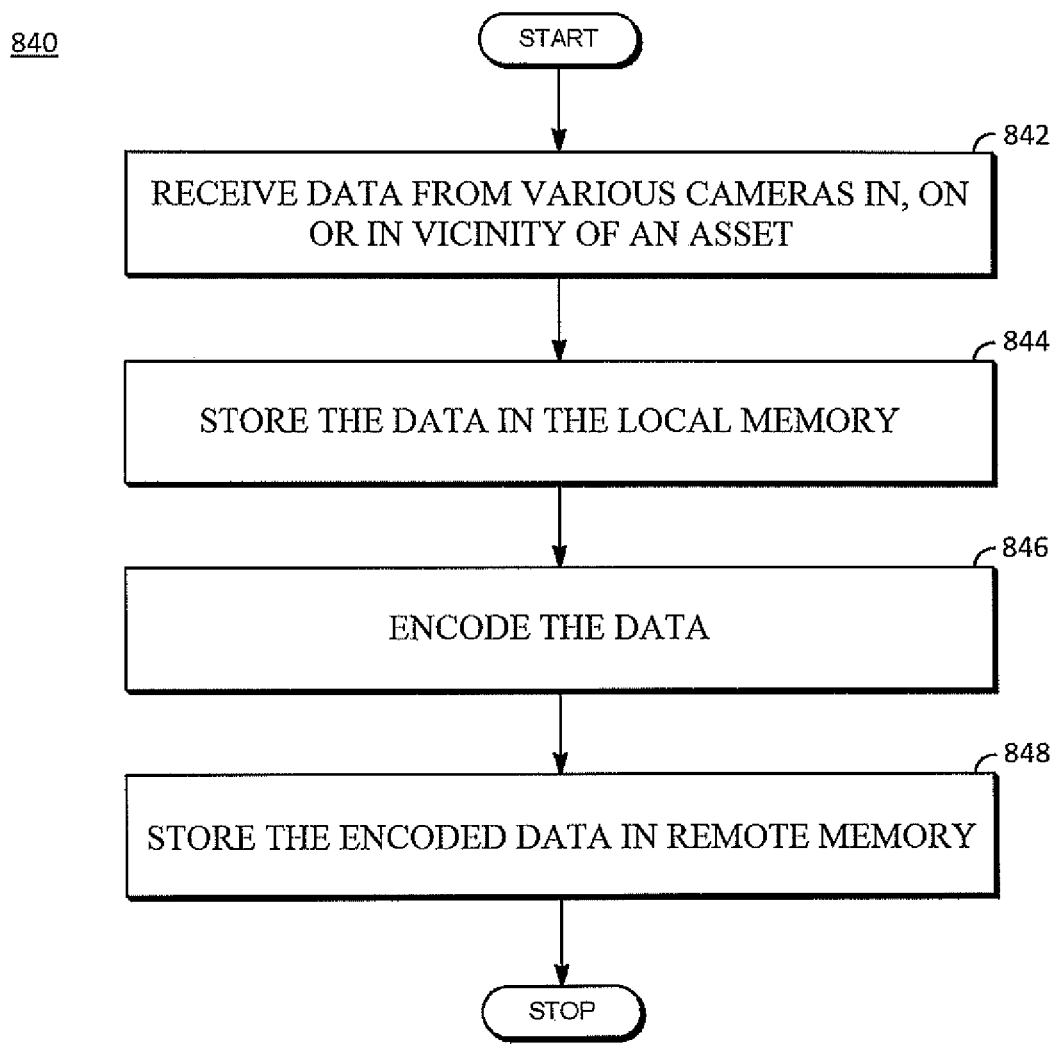
FIG. 9 is a flow diagram of a process for recording video data, audio data, and/or information from a mobile asset in accordance with implementations of this disclosure.

FIG. 9 is a flow diagram showing a process 840 for recording video data, audio data, and/or information from the asset 830 in accordance with an implementation of this disclosure. Video management system 804 receives data signals from various input components 842, such as the 360 degrees cameras, fixed cameras, narrow view cameras, wide view cameras, 360 degrees fisheye view cameras, radar, LIDAR and/or other cameras 802 and the fixed cameras 806 on, in or in the vicinity of the asset 830. The video management system 804 then stores the video data, audio data, and/or information in the crash hardened memory module 810, and the optional non-crash hardened removable storage device of the fourth embodiment, 844 using any combination of industry standard formats, such as, for example, still images, thumbnails, still image sequences, or compressed video formats. Data encoder 814 creates a record that includes a structured series of bits used to configure and record the data signal information 846. In near real-time mode, the video management system 804 stores video data into the crash hardened memory module 810, and the optional non-crash hardened removable storage device of the fourth embodiment, while only sending limited video data, such as thumbnails or very short low resolution video segments, off board to the remote data repository 820 848.

In another implementation, the encoded record is then sent to the onboard data manager 812 that sequentially combines a series of records in chronological order into record blocks that include up to five minutes of data. An interim record block includes less than five minutes of data while a full record block includes a full five minutes of data. Each record block includes all the data required to fully decode the included signals, including a data integrity check. At a minimum, a record block must start with a start record and end with an end record.

In order to ensure that all of the encoded signal data is saved to the crash hardened memory module 810, and the optional non-crash hardened removable storage device of the fourth embodiment, should the data recorder 808 lose power, the onboard data manager 812 stores interim record blocks in the crash hardened memory module 810, and the optional non-crash hardened removable storage device of the fourth embodiment, at a predetermined rate, where the predetermined rate is configurable and/or variable. Interim record blocks are saved at least once per second but can also be saved as frequently as once every tenth of a second. The rate at which interim record blocks are saved depends on the sampling rates of each signal. Every interim record block includes the full set of records since the last full record block. The data recorder 808 can alternate between two temporary storage locations in the crash hardened memory module 810 when recording each interim record block to prevent the corruption or loss of more than one second of data when the data recorder 808 loses power while storing data to the crash hardened memory module 810. Each time a new interim record block is saved to a temporary crash hardened memory location it will overwrite the existing previously stored interim record block in that location.

Every five minutes, in this implementation, when the data recorder 808 is in near real-time mode, the onboard data manager 812 stores a full record block including the last five minutes of encoded signal data into a record segment in the crash hardened memory module 810, and the optional non-crash hardened removable storage device of the fourth embodiment, and sends a copy of the full record block, comprising five minutes of video data, audio data, and/or information, to the remote data manager 818 to be stored in the remote data repository 820 for a predetermined retention period such as two years. The crash hardened memory module 810, and the optional non-crash hardened removable storage device of the fourth embodiment, stores a record segment of the most recent record blocks for a mandated storage duration, which in this implementation is the federally mandated duration that the data recorder 808 must store operational or video data in the crash hardened memory module 810 with an additional 24 hour buffer, and is then overwritten.

Figure 10:
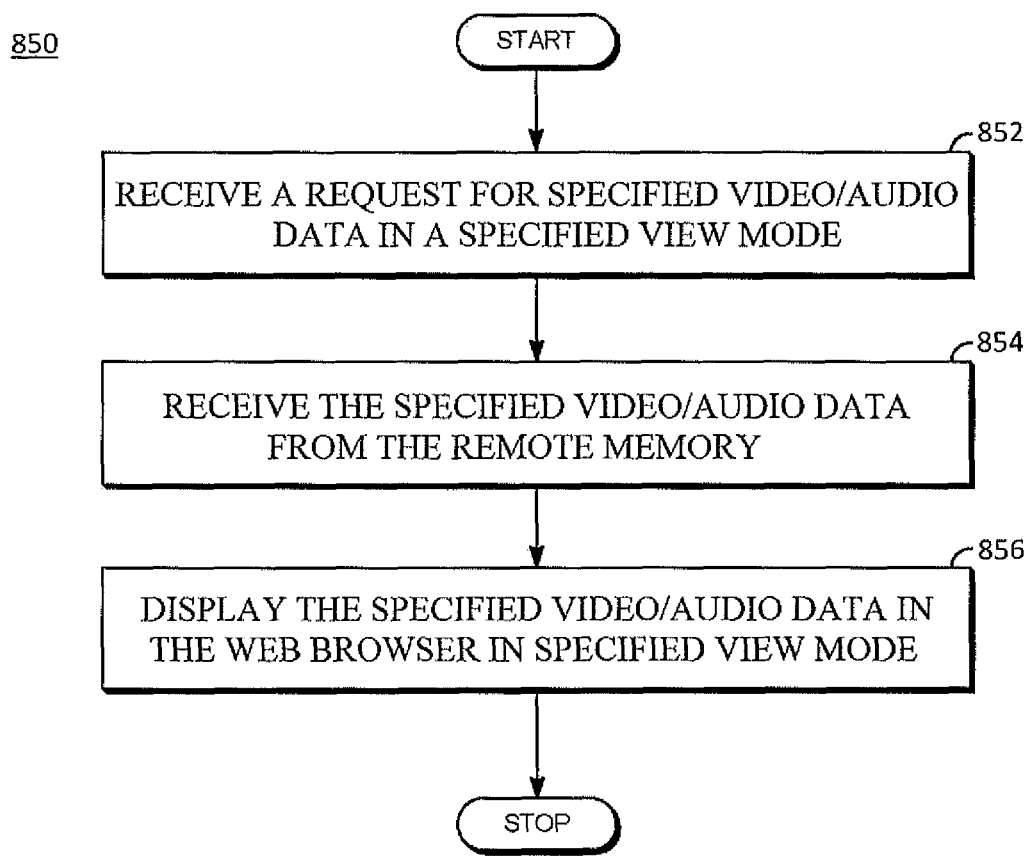
FIG. 10 is a flow diagram of a process for recording video data, audio data, and/or information from the mobile asset in accordance with implementations of this disclosure.

FIG. 10 is a flow diagram showing a process 850 for viewing data and/or information from the asset 830 through a web browser or virtual reality device. When an event occurs or when the remotely located authorized user 834 requests a segment of video data stored in the crash hardened memory module 810 via the web client 826, the onboard data manager 812, depending on the event, will begin sending video data off board in real-time at the best resolution available given the bandwidth of the wireless data link 816. The remotely located user 834 initiates a request for specific video and/or audio data in a specific view mode 852 through the web client 826 which communicates the request to the web server 822 through network 824. The web server 822 requests the specific video and/or audio data from the remote data repository 820 and sends the requested video and/or audio data to the web client 826 854 through the network 824. The web client 826 displays the video and/or audio data in the view mode specified by the user 834 856. The user 834 can then download the specific video and/or audio data to view on the virtual reality device 828. In another implementation, in real-time mode, thumbnails are sent first at one second intervals, then short segments of lower resolution videos, and then short segments of higher resolution videos.

For simplicity of explanation, process 840 and process 850 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A fifth embodiment of a real-time data acquisition and recording system and video analytics system described herein provides real-time, or near real-time, access to a wide range of data, such as event and operational data, video data, and audio data, of a high value asset to remotely located users. The data acquisition and recording system records data relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset by streaming information to the remote data repository in real-time, or near real-time, and making information available at least up to the time of a catastrophic event. DARS performs video analysis of video data recorded of the mobile asset to determine, for example, cab occupancy, track detection, and detection of objects near tracks. The remotely located user may use a common web browser to navigate to and view desired data relating to a selected asset and is not required to interact with the data acquisition and recording system on the asset to request a download of specific data, to locate or transfer files, and to use a custom application to view the data.

DARS provides remotely located users access to video data and video analysis performed by a video analytics system by streaming the data to the remote data repository and to the remotely located user prior to, during, and after an incident, thereby eliminating the need for a user to manually download, extract, and playback video to review the video data to determine cab occupancy, whether a crew member or unauthorized personal was present during an incident, track detection, detection of objects near tracks, investigation or at any other time of interest. Additionally, the video analytics system provides cab occupancy status determination, track detection, detection of objects near tracks, lead and trail unit determination by processing image and video data in real-time, thereby ensuring that the correct data is always available to the user. For example, the real-time image processing ensures that a locomotive designated as the trail locomotive is not in lead service to enhance railroad safety. Prior systems provided a locomotive position within the train by using the train make-up functionality in dispatch systems. At times, the dispatch system information can be obsolete as the information is not updated in real-time and crew personnel can change the locomotive if deemed necessary.

Prior to the system of the present disclosure, inspection crews and/or asset personnel had to manually inspect track conditions, manually check if the vehicle is in the lead or trail position, manually survey the locations of each individual object of interest, manually create a database of geographic locations of all objects of interest, periodically performs manual field surveys of each object of interest to verify their location and identify any changes in geographic location that differs from the original survey, manually update the database when objects of interest change location due to repair or additional infrastructure development since the time when the original database was created, select and download desired data from a digital video recorder and/or data recorder and inspect the downloaded data and/or video offline and check tracks for any obstructions, and the vehicle operator had to physically check for any obstructions and/or switch changes. The system of the present disclosure has eliminated the need for users to perform these steps, only requiring the user to use a common web browser to navigate to the desired data. Asset owners and operators can automate and improve the efficiency and safety of mobile assets in real-time and can actively monitor the track conditions and can get warning information in real-time. The system of the present disclosure eliminates the need for asset owners and operators to download data from the data recorder in order to monitor track conditions and investigate incidents. As an active safety system, DARS can aid the operator to check for any obstructions, send alerts in real-time and/or save the information offline, and send alert information for remote monitoring and storage. Both current and past track detection information and/or information relating to detection of objects near tracks can be stored in the remote data repository in real-time to aid the user in viewing the information when required. The remotely located user may access a common web browser to navigate to desired data relating to a selected asset to view and analyze the operational efficiency and safety of assets in real-time or near real-time.

The real-time data acquisition and recording system of the fifth embodiment can be used to continuously monitor objects of interest and identify in real-time when they have been moved or damaged, become obstructed by foliage, and/or are in disrepair and in need of maintenance. DARS utilizes video, image, and/or audio information to detect and identify various infrastructure objects, such as rail tracks, in the videos, has the ability to follow the tracks as the mobile asset progresses, and has the ability to create, audit against and periodically update a database of objects of interest with the geographical location. The real-time data acquisition and recording system of the fifth embodiment uses at least one of, or any combination of, an image measuring device, a video measuring device, and a range measuring device in, on, or in the vicinity of a mobile asset as part of a data acquisition and recording system. Image measuring devices and/or video measuring devices include, but are not limited to, 360 degrees cameras, fixed cameras, narrow view cameras, wide view cameras, 360 degrees fisheye view cameras, and/or other cameras. Range measuring devices include, but are not limited to, radar and light detection and ranging ("LIDAR"). LIDAR is a surveying method that measures distance to a target by illuminating the target with pulsed laser light and measuring the reflected pulses with a sensor.

DARS can automatically inspect track conditions, such as counting the number of tracks present, identifying the current track the mobile asset is traveling on, and detecting any obstructions or defects present, such as ballast washed out, broken tracks, tracks out of gauge, misaligned switches, switch run-overs, flooding in the tracks, snow accumulations, etc., and plan for any preventive maintenance so as to avoid any catastrophic events. DARS can also detect rail track switches and follow track changes. DARS can further detect the change in the location of data including whether an object is missing, obstructed and/or not present at the expected location. Track detection, infrastructure diagnosing information, and/or infrastructure monitoring information can be displayed to a user through the use of any standard web client, such as a web browser, thereby eliminating the need to download files from the data recorder and use proprietary application software or other external applications to view the information as prior systems required. This process can be extended to automatically create, audit, and/or update a database with geographic locations of objects of interest and to ensure compliance with Federal Regulations. With the system of the present disclosure, cameras previously installed to comply with Federal Regulations are utilized to perform various tasks that previously required human interaction, specialized vehicles, and/or alternate equipment. DARS allows these tasks to be performed automatically as the mobile asset travels throughout the territory as part of normal revenue service and daily operation. DARS can be used to save countless person-hours of manual work by utilizing normal operations of vehicles and previously installed cameras to accomplish tasks which previously required manual effort. DARS can also perform tasks which previously have been performed using specialized vehicles, preventing closure of segments of track to inspect and locate track and objects of interest which often resulted in loss of revenue service and expensive equipment to purchase and maintain. DARS further reduces the amount of time humans are required to be located within the near vicinity of rail tracks, resulting in less overall accidents and potential loss of life.

Data may include, but is not limited to, measured analog and frequency parameters such as speed, pressure, temperature, current, voltage and acceleration that originates from the mobile assets and/or nearby mobile assets; measured Boolean data such as switch positions, actuator positions, warning light illumination, and actuator commands; position, speed and altitude information from a global positioning system (GPS) and additional data from a geographic information system (GIS) such as the latitude and longitude of various objects of interest; internally generated information such as the regulatory speed limit for the mobile asset given its current position; train control status and operational data generated by systems such as positive train control (PTC); vehicle and inertial parameters such as speed, acceleration, and location such as those received from the GPS; GIS data such as the latitude and longitude of various objects of interest; video and image information from at least one camera located at various locations in, on, or in the vicinity of the mobile asset; audio information from at least one microphone located at various locations in, on, or in the vicinity of the mobile asset; information about the operational plan for the mobile asset that is sent to the mobile asset from a data center such as route, schedule, and cargo manifest information; information about the environmental conditions, such as current and forecasted weather, of the area in which the mobile asset is currently operating in or is planned to operate in; and data derived from a combination of any of the above sources including additional data, video, and audio analysis and analytics.

"Track" may include, but is not limited to, the rails and ties of the railroads used for locomotive and/or train transportation. "Objects of interest" may include, but are not limited to, various objects of infrastructure installed and maintained within the nearby vicinity of railroad tracks which may be identified with the use of artificial intelligence, such as supervised learning or reinforcement learning, of asset camera images and video. Supervised learning and/or reinforcement learning utilizes previously labeled data sets defined as "training" data to allow remote and autonomous identification of objects within view of the camera in, on, or in the vicinity of the mobile asset. Supervised learning and/or reinforcement learning trains the neural network models to identify patterns occurring within the visual imagery obtained from the cameras. These patterns, such as people, crossing gates, cars, trees, signals, switches, etc., can be found in single images alone. Successive frames within a video can also be analyzed for patterns such as blinking signals, moving cars, people falling asleep, etc. DARS may or may not require human interaction at any stage of implementation including, but not limited to, labeling training data sets required for supervised learning and/or reinforcement learning. Objects of interest include, but is not limited to, tracks, track centerline points, milepost signs, signals, crossing gates, switches, crossings, and text based signs. "Video analytics" refers to any intelligible information gathered by analyzing videos and/or images recorded from the image, video, and/or range measuring devices, such as at least one camera, such as 360 degrees cameras, fixed cameras, narrow view cameras, wide view cameras, 360 degrees fisheye view cameras, radar, LIDAR, and/or other cameras, in, on, or in the vicinity of the mobile asset, such as, but not limited to, objects of interest, geographic locations of objects, track obstructions, distances between objects of interest and the mobile asset, track misalignment, etc. The video analytics system can also be used in any mobile asset, dwelling area, space, or room containing a surveillance camera to enhance video surveillance. In mobile assets, the video analytics system provides autonomous cab occupied event detection to remotely located users economically and efficiently.

Figure 15:
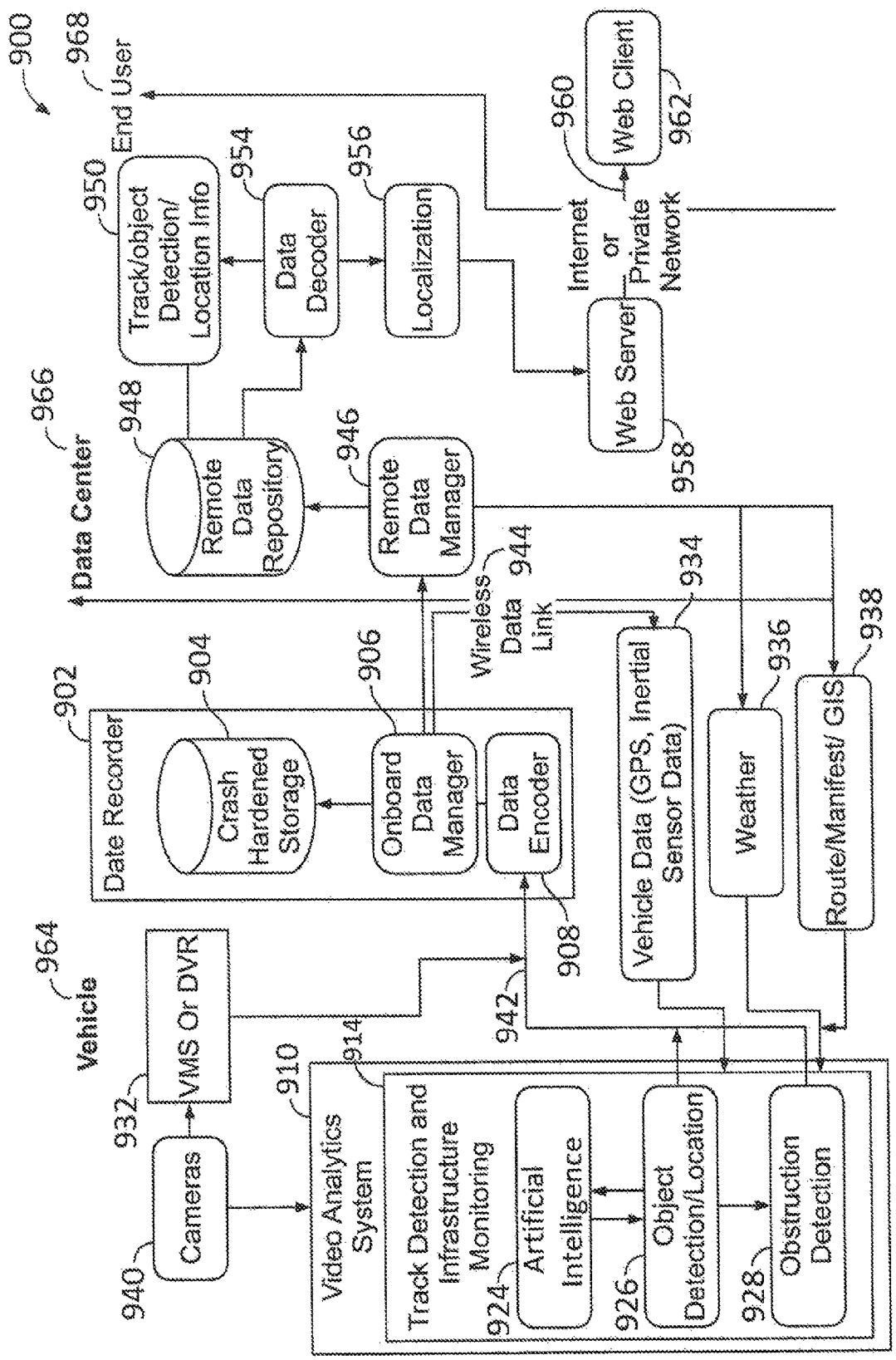
FIG. 15 illustrates a field implementation of a first embodiment of a data acquisition and recording system video content analysis system in accordance with implementations of this disclosure.

FIG. 15 illustrates a field implementation of a fifth embodiment of an exemplary real-time data acquisition and recording system (DARS) 900 in which aspects of the disclosure can be implemented. DARS 900 is a system that delivers real time information, video information, and audio information from a data recorder 902 on a mobile asset 964 to remotely located end users 968 via a data center 966. The data recorder 902 is installed on the vehicle or mobile asset 964 and communicates with any number of various information sources through any combination of wired and/or wireless data links 942, such as a wireless gateway/router (not shown). Data recorder 902 gathers video data, audio data, and other data or information from a wide variety of sources, which can vary based on the asset's configuration, through onboard data links 942. The data recorder 902 comprises a local memory component, such as a crash hardened memory module 904, an onboard data manager 906, and a data encoder 908 in the asset 964. In a sixth embodiment, the data recorder 902 can also include a non-crash hardened removable storage device (not shown). An exemplary hardened memory module 904 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Association regulations, a crash hardened memory module in compliance with any applicable Code of Federal Regulations, or any other suitable hardened memory device as is known in the art. The wired and/or wireless data links can include any one of or combination of discrete signal inputs, standard or proprietary Ethernet, serial connections, and wireless connections.

DARS 900 further comprises a video analytics system 910 that includes a track and/or object detection and infrastructure monitoring component 914. The track detection and infrastructure monitoring component 914 comprises a supervised learning and/or reinforcement learning component 924, or other neural network or artificial intelligence component, an object detection and location component 926, and an obstruction detection component 928 that detects obstructions present on or near the tracks and/or camera obstructions such as personnel blocking the cameras view. In this implementation, live video data is captured by at least one camera 940 mounted in the cab of the asset 964, on the asset 964, or in the vicinity of the asset 964. The cameras 940 are placed at an appropriate height and angle to capture video data in and around the asset 964 and obtain a sufficient amount of the view for further processing. The live video data and image data is captured in front of and/or around the asset 964 by the cameras 940 and is fed to the track and/or object detection and infrastructure monitoring component 914 for analysis. The track detection and infrastructure monitoring component 914 of the video analytics system 910 processes the live video and image data frame by frame to detect the presence of the rail tracks and any objects of interest. Camera position parameters such as height, angle, shift, focal length, and field of view can either be fed to the track and/or object detection and infrastructure monitoring component 914 or the cameras 940 can be configured to allow the video analytics system 910 to detect and determine the camera position and parameters.

To make a status determination, such as cab occupancy detection, the video analytics system 910 uses the supervised learning and/or reinforcement learning component 924, and/or other artificial intelligence and learning algorithms to evaluate, for example, video data from cameras 940, asset data 934 such as speed, GPS data, and inertial sensor data, weather component 936 data, and route/crew, manifest, and GIS component data 938. Cab occupancy detection is inherently susceptible to environmental noise sources such as light reflecting off clouds and sunlight passing through buildings and trees while the asset is moving. To handle environmental noise, the supervised learning and/or reinforcement learning component 924, the object detection and location component 926, the obstruction detection component, asset component 934 data that can include speed, GPS data, and inertial sensor data, weather component 936 data, and other learning algorithms are composed together to form internal and/or external status determination involving the mobile asset 964. The track and/or object detection and infrastructure monitoring component 914 can also include a facial recognition system adapted to allow authorizing access to locomotive as part of locomotive security system, a fatigue detection component adapted to monitor crew alertness, and activity detection component to detect unauthorized activities such as smoking.

Additionally, the video analytics system 910 may receive location information, including latitude and longitude coordinates, of a signal, such as a stop signal, traffic signal, speed limit signal, and/or object signal near the tracks, from the asset owner. The video analytics system 910 then determines whether the location information received from the asset owner is correct. If the location information is correct, the video analytics system 910 stores the information and will not recheck the location information again for a predetermined amount of time, such as checking the location information on a monthly basis. If the location information is not correct, the video analytics system 910 determines the correct location information and reports the correct location information to the asset owners, stores the location information, and will not recheck the location information again for a predetermined amount of time, such as checking the location information on a monthly basis. Storing the location information provides easier detection of a signal, such as a stop signal, traffic signal, speed limit signal, and/or object signal near the tracks.

Supervised learning and/or reinforcement learning, using the supervised learning and/or reinforcement learning component 924, of the tracks is performed by making use of various information obtained from consecutive frames of video and/or images and also using additional information received from the data center 966 and a vehicle data component 934 that includes inertial sensor data and GPS data to determine learned data. The object detection and location component 926 utilizes the learned data received from the supervised learning and/or reinforcement learning component 924 and specific information about the mobile asset 964 and railroad such as track width and curvatures, ties positioning, and vehicle speed to differentiate the rail tracks, signs, signals, etc. from other objects to determine object detection data. The obstruction detection component 928 utilizes the object detection data received from the object detection and location component 926, such as information on obstructions present on or near the tracks and/or camera obstructions such as personnel blocking the cameras view and additional information from a weather component 936, a route/crew manifest data and GIS data component 938, and the vehicle data component 934 that includes inertial sensor data and GPS data to enhance accuracy and determine obstruction detection data. Mobile asset data from the vehicle data component 934 includes, but is not limited to, speed, location, acceleration, yaw/pitch rate, and rail crossings. Any additional information received and utilized from the data center 966 includes, but is not limited to, day and night details and geographic position of the mobile asset 964.

Infrastructure objects of interest, information processed by the track and/or object detection and infrastructure monitoring component 914, and diagnosis and monitoring information is sent to the data encoder 908 of the data recorder 902 via onboard data links 942 to encode the data. The data recorder 902 stores the encoded data in the crash hardened memory module 904, and optionally in the optional non-crash hardened removable storage device, and sends the encoded information to a remote data manager 946 in the data center 966 via a wireless data link 944. The remote data manager 946 stores the encoded data in a remote data repository 948 in the data center 966.

To determine obstruction detection 928 or object detection 926 such as the presence of track in front of the asset, objects on and/or near the tracks, obstructions on or near the tracks, and/or obstructions blocking the cameras view, 964, the vehicle analytics system 910 uses the supervised learning and/or reinforcement learning component 924, or other artificial intelligence, object detection and location component 926, and obstruction detection component 928, and other image processing algorithms to process and evaluate camera images and video data from cameras 940 in real-time. The track and/or object detection and infrastructure monitoring component 914 uses the processed video data along with asset component 934 data that can include speed, GPS data, and inertial sensor data, weather component 936 data, and route/crew, manifest, and GIS component 938 data, to determine the external status determinations, such as lead and trail mobile assets, in real-time. When processing image and video data for track and/or object detection, for example, the video analytics system 910 automatically configures cameras 940 parameters needed for track detection, detects run through switches, counts the number of tracks, detects any additional tracks along the side of the asset 964, determines the track on which the asset 964 is currently running, detects the track geometry defects, detects track washout scenarios such as detecting water near the track within defined limits of the tracks, and detects missing slope or track scenarios. Object detection accuracy depends on the existing lighting condition in and around the asset 964. DARS 900 will handle the different lighting conditions with the aid of additional data collected from onboard the asset 964 and the data center 966. DARS 900 is enhanced to work in various lighting conditions, to work in various weather conditions, to detect more objects of interest, to integrate with existing database systems to create, audit, and update data automatically, to detect multiple tracks, to work consistently with curved tracks, to detect any obstructions, to detect any track defect that could possibly cause safety issues, and to work in low cost embedded systems.

The internal and/or external status determination from the video analytics system 910, such as cab occupancy, object detection and location, such as track detection and detection of objects near tracks, and obstruction detection, such as obstructions on or near the tracks and obstructions blocking the cameras, is provided to the data recorder 902, along with any data from a vehicle management system (VMS) or digital video recorder component 932, via onboard data links 942. The data recorder 902 stores the internal and/or external status determination, the object detection and location component 926 data, and the obstruction detection component 928 data in the crash hardened memory module 904, and optionally in the non-crash hardened removable storage device of the second embodiment, and the remote data repository 948 via the remote data manager 946 located in the data center 966. A web server 958 provides the internal and/or external status determination, the object detection and location component 926 information, and the obstruction detection component 928 information to a remotely located user 968 via a web client 962 upon request.

The data encoder 908 encodes at least a minimum set of data that is typically defined by a regulatory agency. The data encoder 908 receives video, image and audio data from any of the cameras 940, the video analytics system 910, and the video management system 932 and compresses or encodes and time synchronizes the data in order to facilitate efficient real-time transmission and replication to the remote data repository 948. The data encoder 908 transmits the encoded data to the onboard data manager 906 which then sends the encoded video, image, and audio data to the remote data repository 948 via the remote data manager 946 located in the data center 966 in response to an on-demand request by the user 968 or in response to certain operating conditions being observed onboard the asset 964. The onboard data manager 906 and the remote data manager 946 work in unison to manage the data replication process. The remote data manager 946 in the data center 966 can manage the replication of data from a plurality of assets 964.

The onboard data manager 908 determines if the event detected, the internal and/or external status determination, object detection and location, and/or obstruction detection, should be queued or sent off immediately based on prioritization of the event detected. For example, in a normal operating situation, detecting an obstruction on the track is much more urgent than detecting whether someone is in the cab of the asset 964. The onboard data manager 908 also sends data to the queuing repository (not shown). In near real-time mode, the onboard data manager 906 stores the encoded data received from the data encoder 908 and any event information in the crash hardened memory module 904 and in the queueing repository. After five minutes of encoded data has accumulated in the queuing repository, the onboard data manager 906 stores the five minutes of encoded data to a remote data repository 948 via the remote data manager 946 in the data center 966 over the wireless data link 944. In real-time mode, the onboard data manager 908 stores the encoded data received from the data encoder 908 and any event information to the crash hardened memory module 904 and to the remote data repository 948 via the remote data manager 946 in the data center 966 over the wireless data link 944.

In this implementation, the onboard data manager 906 sends the video data, audio data, internal and/or external status determination, object detection and location information, obstruction detection information, and any other data or event information to the remote data repository 948 via the remote data manager 946 in the data center 966 through the wireless data link 944. Wireless data link 944 can be, for example, a wireless local area network (WLAN), wireless metropolitan area network (WMAN), wireless wide area network (WWAN), wireless virtual private network (WVPN), a cellular telephone network or any other means of transferring data from the data recorder 902 to, in this example, the remote data manager 946. The process of retrieving the data remotely from the asset 964 requires a wireless connection between the asset 964 and the data center 966. When a wireless data connection is not available, the data is stored and queued until wireless connectivity is restored.

In parallel with data recording, the data recorder 902 continuously and autonomously replicates data to the remote data repository 948. The replication process has two modes, a real-time mode and a near real-time mode. In real-time mode, the data is replicated to the remote data repository 10 every second. In near real-time mode, the data is replicated to the remote data repository 15 every five minutes. The rate used for near real-time mode is configurable and the rate used for real-time mode can be adjusted to support high resolution data by replicating data to the remote data repository 15 every 0.10 seconds. Near real-time mode is used during normal operation, under most conditions, in order to improve the efficiency of the data replication process.

Real-time mode can be initiated based on events occurring onboard the asset 964 or by a request initiated from the data center 966. A typical data center 966 initiated request for real-time mode is initiated when the remotely located user 968 has requested real-time information from the web client 962. A typical reason for real-time mode to originate onboard the asset 964 is the detection of an event or incident involving the asset 964 such as an operator initiating an emergency stop request, emergency braking activity, rapid acceleration or deceleration in any axis, or loss of input power to the data recorder 902. When transitioning from near real-time mode to real-time mode, all data not yet replicated to the remote data repository 948 is replicated and stored in the remote data repository 948 and then live replication is initiated. The transition between near real-time mode and real-time mode typically occurs in less than five seconds. After a predetermined amount of time has passed since the event or incident, predetermined amount of time of inactivity, or when the user 968 no longer desires real-time information from the asset 964, the data recorder 902 reverts to near real-time mode. The predetermined amount of time required to initiate the transition is configurable and is typically set to ten minutes.

When the data recorder 902 is in real-time mode, the onboard data manager 906 attempts to continuously empty its queue to the remote data manager 946, storing the data to the crash hardened memory module 940, and optionally to the optional non-crash hardened removable storage device of the sixth embodiment, and sending the data to the remote data manager 946 simultaneously.

Upon receiving video data, audio data, internal and/or external status determination, object detection and location information, obstruction detection information, and any other data or information to be replicated from the data recorder 902, the remote data manager 946 stores the data it receives from the onboard data manager 906, such as encoded data and detected event data, to the remote data repository 948 in the data center 966. The remote data repository 948 can be, for example, cloud-based data storage or any other suitable remote data storage. When data is received, a process is initiated that causes a data decoder 954 to decode the recently replicated data from the remote data repository 948 and send the decoded data to a track/object detection/location information component 950 that looks at the stored data for additional 'post-processed' events. The track/object detection/location information component 950 includes an object/obstruction detection component for determining internal and/or external status determinations, object detection and location information, and obstruction detection information, in this implementation. Upon detecting internal and/or external information, object detection and location information, and/or obstruction detection information, the track/object detection/location information component 950 stores the information in the remote data repository 948.

Figure 16A:
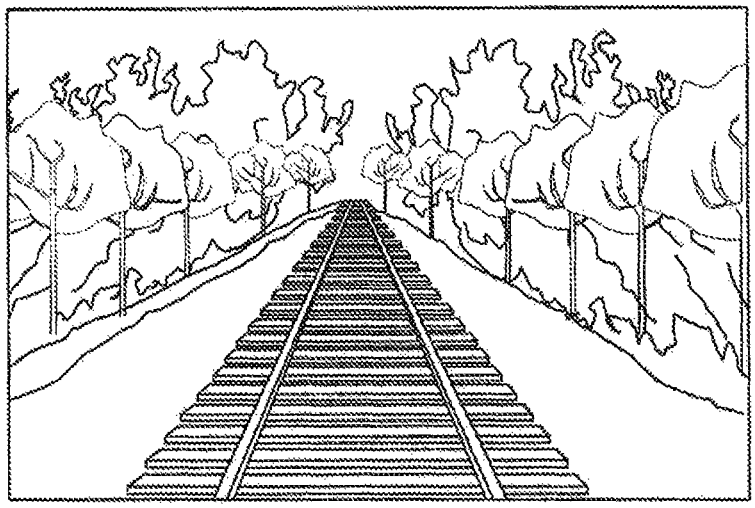
FIG. 16A is a diagram that illustrates exemplary track detection in accordance with implementations of this disclosure.
Figure 16B:
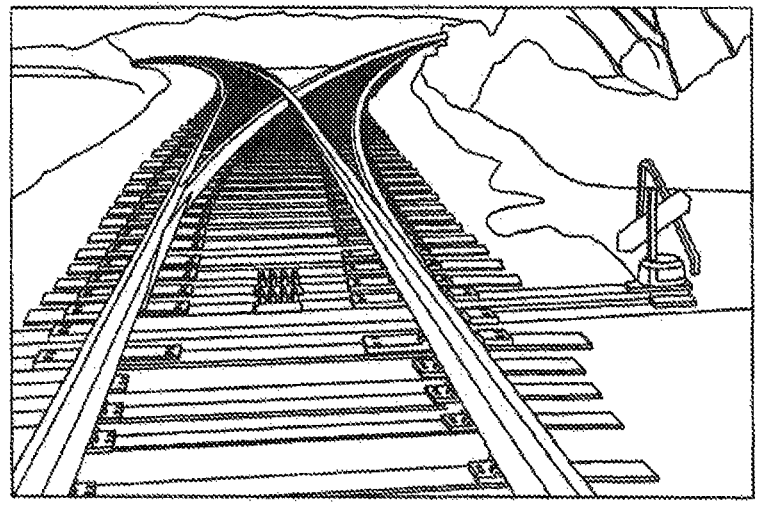
FIG. 16B is a diagram that illustrates exemplary track detection and switch detection in accordance with implementations of this disclosure.
Figure 16C:
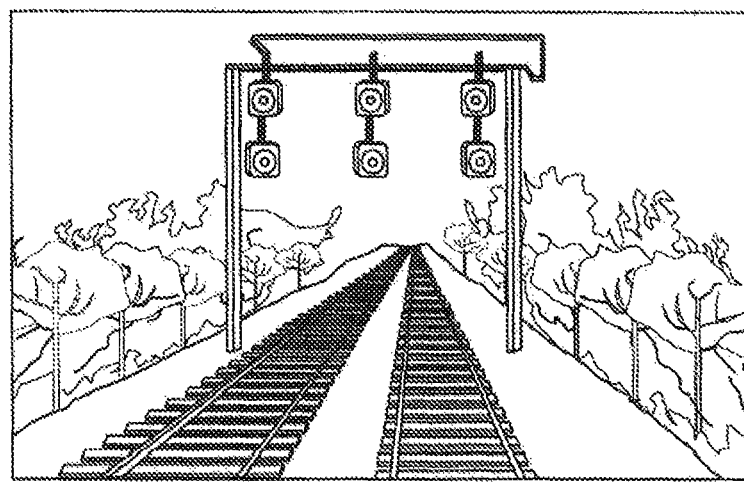
FIG. 16C is a diagram that illustrates exemplary track detection, count the number of tracks, and signal detection in accordance with implementations of this disclosure.
Figure 16D:
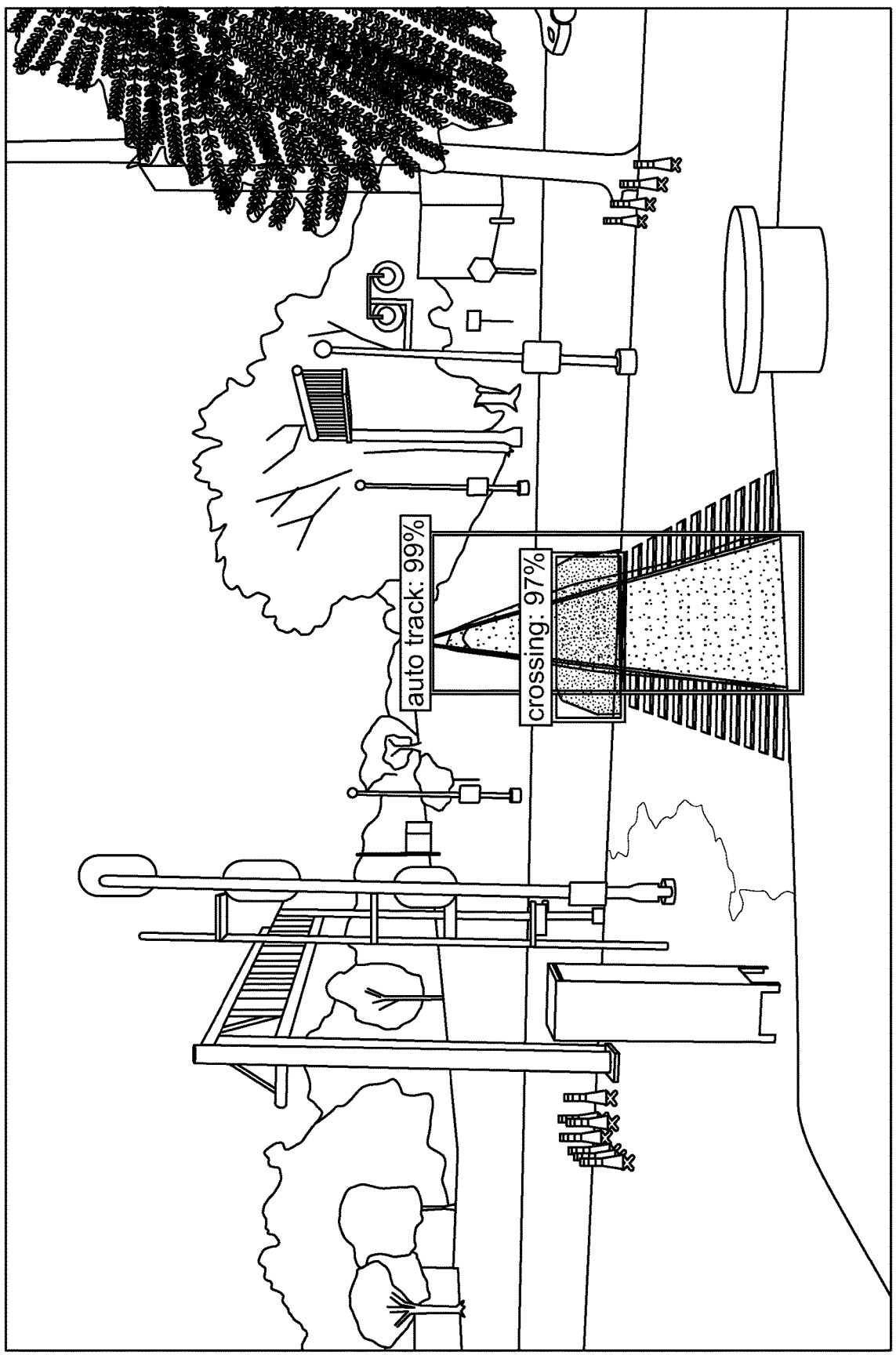
FIG. 16D is a diagram that illustrates exemplary crossing and track detection in accordance with implementations of this disclosure.
Figure 16E:
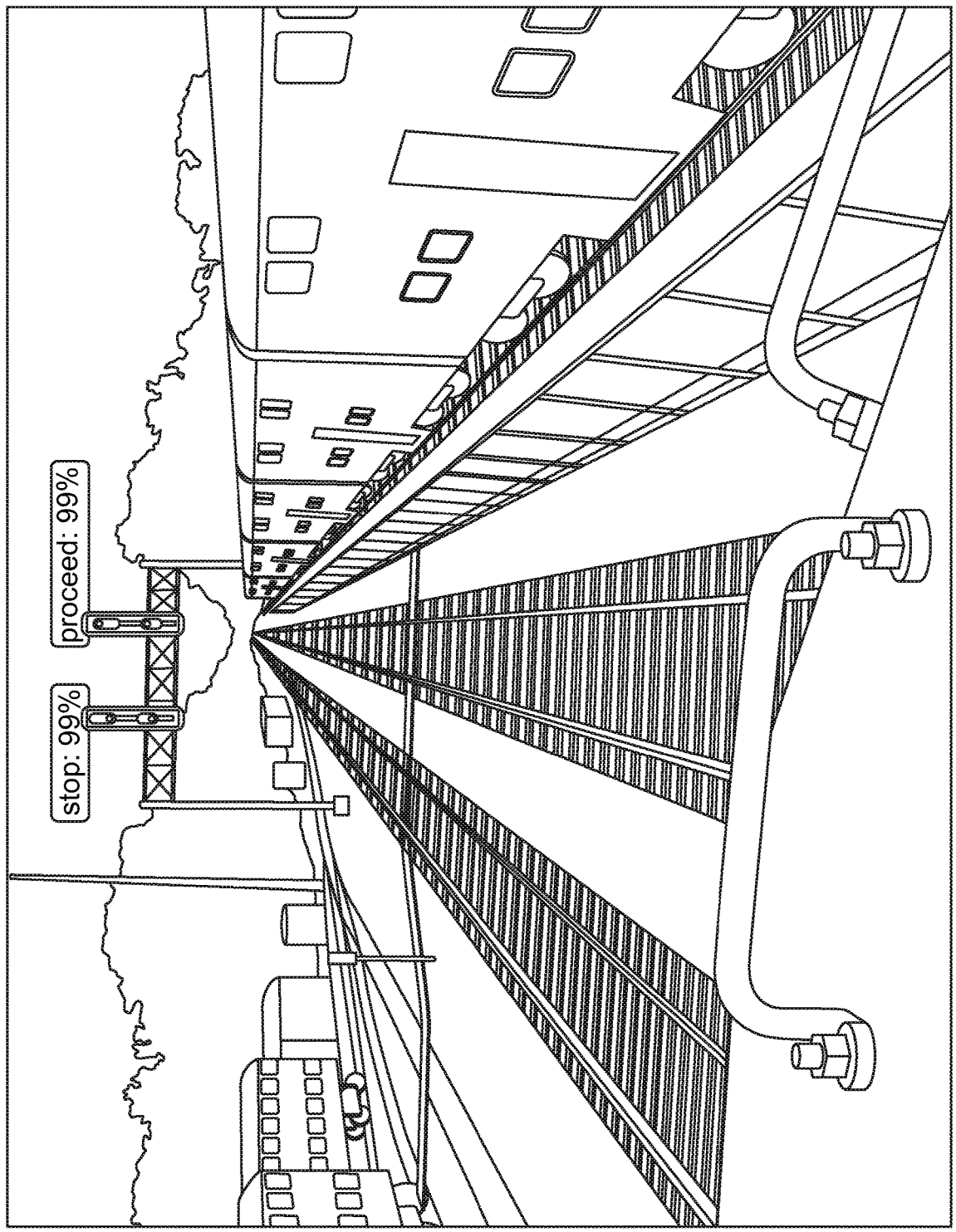
FIG. 16E is a diagram that illustrates exemplary dual overhead signal detection in accordance with implementations of this disclosure.
Figure 16F:
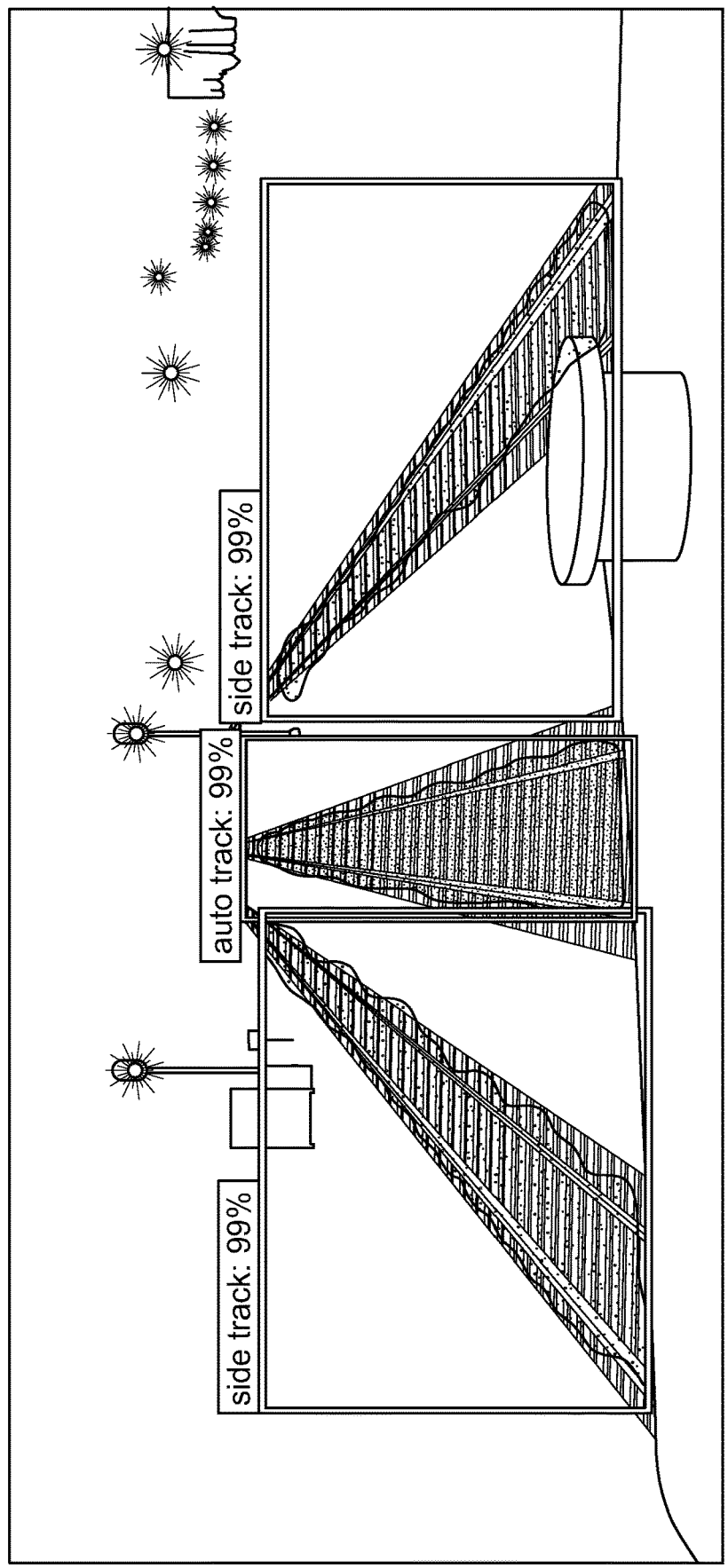
FIG. 16F is a diagram that illustrates exemplary multi-track detection in accordance with implementations of this disclosure.
Figure 16G:
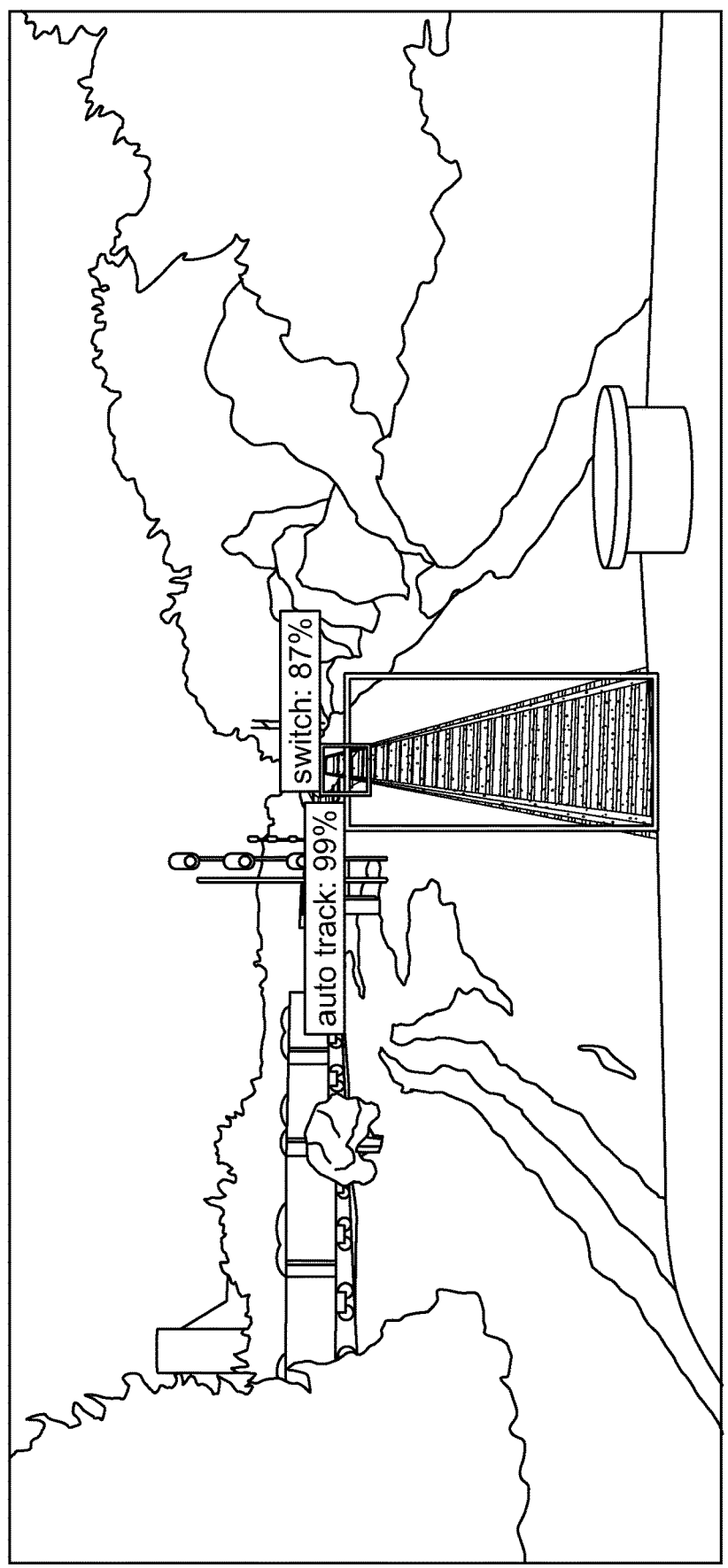
FIG. 16G is a diagram that illustrates exemplary switch and track detection in accordance with implementations of this disclosure.
Figure 16H:
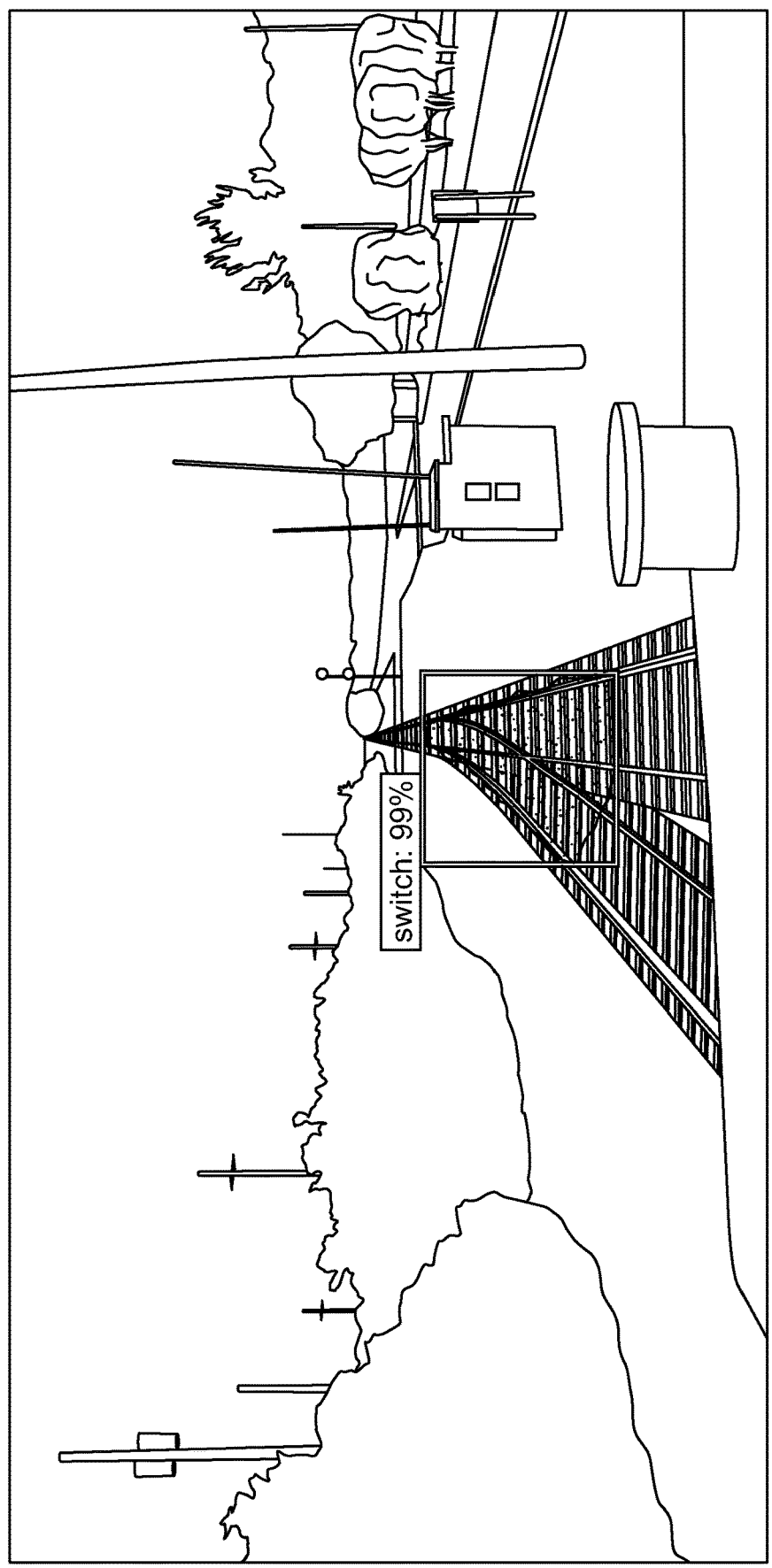
FIG. 16H is a diagram that illustrates exemplary switch detection in accordance with implementations of this disclosure.

The remotely located user 968 can access video data, audio data, internal and/or external status determination, object detection and location information, obstruction detection information, and any other information stored in the remote data repository 948, including track information, asset information, and cab occupancy information, relating to the specific asset 964, or a plurality of assets, using the standard web client 962, such as a web browser, or a virtual reality device (not shown) which, in this implementation, can display thumbnail images of selected cameras. The web client 962 communicates the user's 968 request for information to a web server 958 through a network 960 using common web standards, protocols, and techniques. Network 960 can be, for example, the Internet. Network 960 can also be a local area network (LAN), metropolitan area network (MAN), wide area network (WAN), virtual private network (VPN), a cellular telephone network or any other means of transferring data from the web server 958 to, in this example, the web client 962. The web server 958 requests the desired data from the remote data repository 948 and the data decoder 954 obtains the requested data relating to the specific asset 964 from the remote data repository 948 upon request from the web server 958. The data decoder 954 decodes the requested data and sends the decoded data to a localizer 956. The localizer 956 identifies the profile settings set by user 968 by accessing the web client 962 and uses the profile settings to prepare the information being sent to the web client 962 for presentation to the user 968, as the raw encoded data and detected track/object detection/location information is saved to the remote data repository 948 using coordinated universal time (UTC) and international system of units (SI units). The localizer 956 converts the decoded data into a format desired by the user 968, such as the user's 968 preferred unit of measure and language. The localizer 956 sends the localized data in the user's 968 preferred format to the web server 958 as requested. The web server 958 then sends the localized data to the web client 962 for viewing and analysis, providing playback and real-time display of standard video and 360 degrees video, along with the internal and/or external status determination, object detection and location information, and obstruction detection information, such as the track and/or object detection (FIG. 16A), track and switch detection (FIG. 16B), track and/or object detection, count the number of tracks, and signal detection (FIG. 16C), crossing and track and/or object detection (FIG. 16D), dual overhead signal detection (FIG. 16E), multi-track and/or multi-object detection (FIG. 16F), switch and track and/or object detection (FIG. 16G), and switch detection (FIG. 16H).

The web client 962 is enhanced with a software application that provides the playback of 360 degrees video and/or other video in a variety of different modes. The user 968 can elect the mode in which the software application presents the video playback such as, for example, fisheye view, dewarped view, panorama view, double panorama view, and quad view.

FIG. 17 is a flow diagram showing a process 970 for determining an internal status of the asset 964 in accordance with an implementation of this disclosure. The video analytics system 910 receives data signals from various input components 972, such as cameras 940, including but not limited to 360 degrees cameras, fixed cameras, narrow view cameras, wide view cameras, 360 degrees fisheye view cameras, radar, LIDAR, and/or other cameras, on, in or in vicinity of the asset 964, vehicle data component 934, weather component 936, and route/manifest and GIS component 938. The video analytics system 910 processes the data signals using supervised learning and/or reinforcement learning component 974 and determines an internal status 976 such as cab occupancy.

FIG. 18 is a flow diagram showing a process 980 for determining object detection/location and obstruction detection occurring externally and internally to the asset 964 in accordance with an implementation of this disclosure. The video analytics system 910 receives data signals from various input components 982, such as cameras 940, including but not limited to 360 degrees cameras, fixed cameras, narrow view cameras, wide view cameras, 360 degrees fisheye view cameras, radar, LIDAR, and/or other cameras, on, in or in vicinity of the asset 964, vehicle data component 934, weather component 936, and route/manifest and GIS component 938. The video analytics system 910 processes the data signals using the supervised learning and/or reinforcement learning component 924, the object detection/location component 926, and the obstruction detection component 928 984 and determines obstruction detection 986 and object detection and location 988 such as track presence.

For simplicity of explanation, process 970 and process 980 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A seventh embodiment of a real-time data acquisition and recording system and automated signal compliance monitoring and alerting system described herein provides real-time, or near real-time, access to a wide range of data, such as event and operational data, video data, and audio data, related to a high value asset to remotely located users such as asset owners, operators and investigators. The automated signal compliance monitoring and alerting system records data, via a data recorder, relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data recorder on the asset to request a download of specific data, to locate and transfer files, and to use a custom application to view the data. The system of the present disclosure retains typical recording capability and adds the ability to stream data to a remote data repository and remote end user prior to, during, and after an incident. In the vast majority of situations, the information recorded in the data recorder is redundant and not required as data has already been acquired and stored in the remote data repository.

The automated signal monitoring and alerting system also automatically monitors and provides historical and real-time alerting for mobile assets, such as locomotives, trains, airplanes, and automobiles, in violation of a signal aspect, such as a stop light, traffic light, and/or speed limit signal, or operating the mobile asset unsafely in an attempt to maintain compliance to a signal, such as a stop light, traffic light, and/or speed limit signal. The automated signal monitoring and alerting system combines the use of image analytics, GPS location, braking forces, and vehicles speed, as well as automated electronic notifications, to alert personnel onboard and/or off-board the mobile asset in real-time when a mobile asset violates safe operating rules, such as, for example, when a stop signal is passed by a mobile asset prior to stopping and receiving authority (red light violation), when a restricting signal indicating reduced speed limits is violated by a mobile asset traveling at greater speed, and when a mobile asset applies late and/or excessive braking forces in order to stop before passing a stop/red signal.

Prior to the automated signal monitoring and alerting system of the present disclosure, operations center personnel relied on mobile asset crews to report when a safe operating rule is violated. Sometimes a catastrophic mobile asset on mobile asset collision resulted, with subsequent investigations realizing the safe operating rules violation had occurred. Additionally, excessive braking forces may have caused mechanical failure to a part of the mobile asset and in situations where the mobile asset is a locomotive and/or train, excessive braking forces may have resulted in derailment, with subsequent investigations finding the safe operating rule violation as the root cause. The system of the present disclosure enables users to monitor and/or be alerted when a safe operating rule violation occurs, prior to mechanical failure, collision, derailment, and/or another accident occurs.

An end user may subscribe to be alerted when a safe operating rule violation has occurred, and will receive email, text message, and/or in-browser electronic notifications within minutes of the actual event occurring. The end user may utilize historical records to analyze data to identify patterns, such as, for example, problem locations, compromised line of sight, faulty equipment, and underperforming crews, which can be useful in implementing new and safer operating rules or crew educational opportunities for continuous improvement. The system of the present disclosure enables the end user to leverage continuous electronic monitoring and extensive image analytics to understand any and all times when a mobile asset is operating unsafely due to a safe operating rule violation and/or signal non-compliance.

The automated signal monitoring and alerting system is used by vehicle and/or mobile asset owners, operators, and investigators to view and analyze the operational efficiency and safety of mobile assets in real-time. The ability to view operations in real-time enables rapid evaluation and adjustment of behavior. During an incident, real-time information can facilitate triaging the situation and provide valuable information to first responders. During normal operation, real-time information can be used to audit crew performance and to aid network wide operational safety and awareness.

The automated signal monitoring and alerting system utilizes outward facing cameras and/or other cameras, GPS location, speed, and acceleration, as well as vehicle, train, and/or mobile asset brake pressure sensor data in a completely integrated, time-synchronized, automated system to identify unsafe and potentially catastrophic operating practices to provide real-time feedback to mobile asset crews and management. The automated signal monitoring and alerting system also provides automated data and video download to users with various data sources so as to allow complete knowledge of the operating environment at the time of alerting.

Data may include, but is not limited to, analog and digital parameters such as speed, pressure, temperature, current, voltage, and acceleration which originate from the asset and/or nearby assets, Boolean data such as switch positions, actuator position, warning light illumination, and actuator commands, global positioning system (GPS) data and/or geographic information system (GIS) data such as position, speed, and altitude, internally generated information such as the regulatory speed limit for an asset given its current position, video and image information from cameras located at various locations in, on or in the vicinity of the asset, audio information from microphones located at various locations in, on or in vicinity of the asset, information about the operational plan for the asset that is sent to the asset from a data center such as route, schedule, and cargo manifest information, information about the environmental conditions, including current and forecasted weather conditions, of the area in which the asset is currently operating in or is planned to operate in, asset control status and operational data generated by systems such as positive train control (PTC) in locomotives, and data derived from a combination from any of the above including, but not limited to, additional data, video, and audio analysis and analytics.

Figure 19:
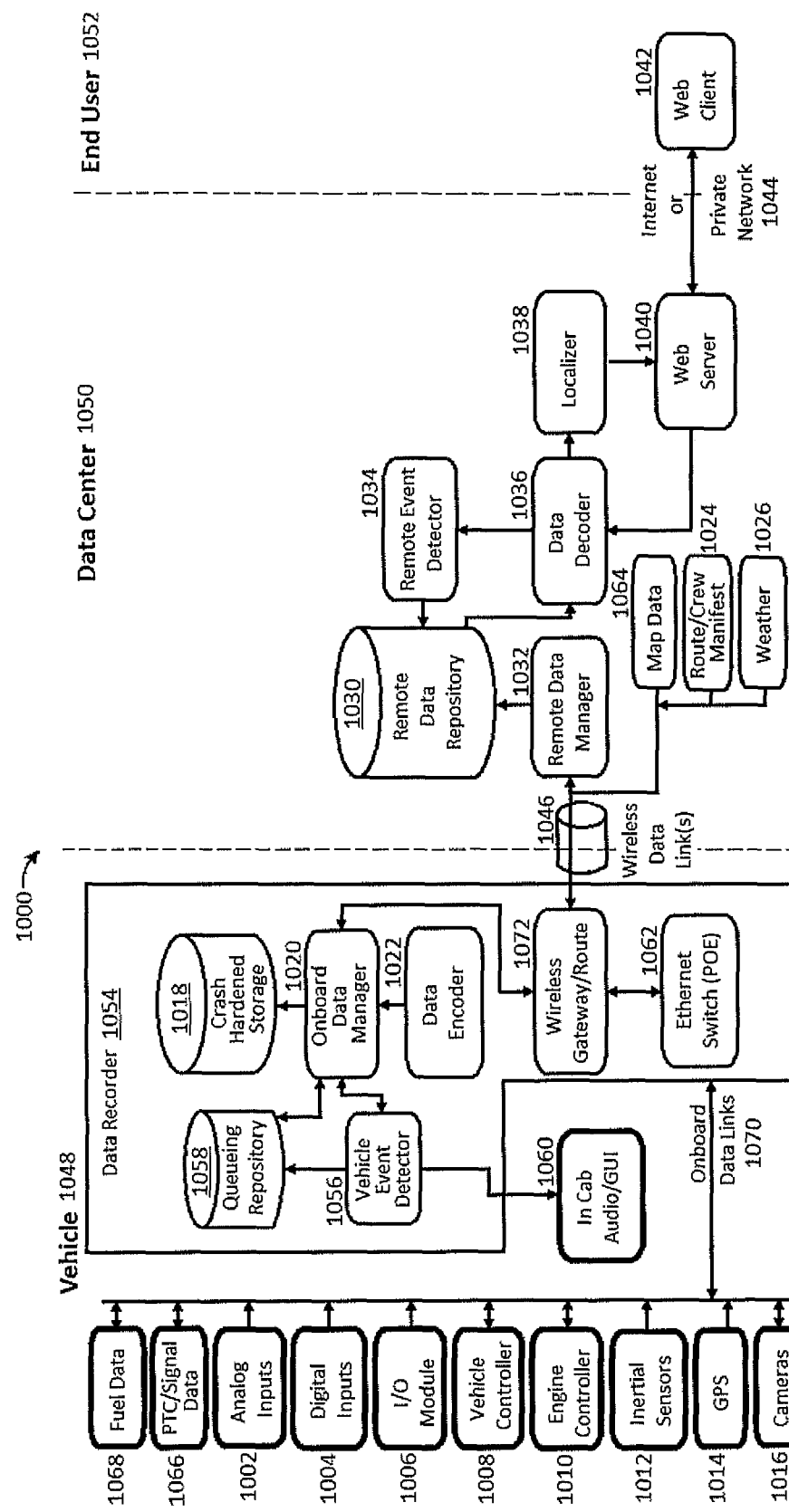
FIG. 19 illustrates a field implementation of a seventh embodiment of an exemplary real-time data acquisition and recording system in accordance with implementations of this disclosure.

FIG. 19 illustrates a field implementation of the seventh embodiment of the exemplary real-time data acquisition and recording system (DARS) 1000 and automated signal monitoring and alerting system 1080 in which aspects of the disclosure can be implemented. DARS 1000 is a system that delivers real time information to remotely located end users from a data recording device. DARS 1000 includes a data recorder 1054 that is installed on a vehicle or mobile asset 1048 and communicates with any number of various information sources through any combination of onboard wired and/or wireless data links 1070 such as a wireless gateway/router, or off board information sources via a data center 1050 of DARS 1000 via data links such as wireless data links 1046. Data recorder 1054 comprises an onboard data manager 1020, a data encoder 1022, a vehicle event detector 1056, a queueing repository 1058, and a wireless gateway/router 1072. Additionally, in this implementation, data recorder 1054 can include a crash hardened memory module 1018 and/or an Ethernet switch 1062 with or without power over Ethernet (POE). An exemplary hardened memory module 1018 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Administration regulations, a crash hardened memory module in compliance with any applicable Code of Federal Regulations, or any other suitable hardened memory device as is known in the art. In an eighth embodiment, the data recorder can further include an optional non-crash hardened removable storage device (not shown).

The wired and/or wireless data links 1070 can include any one of or combination of discrete signal inputs, standard or proprietary Ethernet, serial connections, and wireless connections. Ethernet connected devices may utilize the data recorder's 1054 Ethernet switch 1062 and can utilize POE. Ethernet switch 1062 may be internal or external and may support POE. Additionally, data from remote data sources, such as a map component 1064, a route/crew manifest component 1024, and a weather component 1026 in the implementation of FIG. 19, is available to the onboard data manager 1020 and the vehicle event detector 1056 from the data center 1050 through the wireless data link 1046 and the wireless gateway/router 1072.

Data recorder 1054 gathers data or information from a wide variety of sources, which can vary widely based on the asset's configuration, through onboard data link 1070. The data encoder 1022 encodes at least a minimum set of data that is typically defined by a regulatory agency. In this implementation, the data encoder 1022 receives data from a wide variety of asset 1048 sources and data center 1050 sources. Information sources can include any number of components in the asset 1048, such as any of analog inputs 1002, digital inputs 1004, I/O module 1006, vehicle controller 1008, engine controller 1010, inertial sensors 1012, global positioning system (GPS) 1014, cameras 1016, positive train control (PTC)/signal data 1066, fuel data 1068, cellular transmission detectors (not shown), internally driven data and any additional data signals, and any of number of components in the data center 1050, such as any of the route/crew manifest component 1024, the weather component 1026, the map component 1064, and any additional data signals. Furthermore, asset 1048 information sources can be connected to the data recorder 1054 through any combination of wired or wireless data links 1070. The data encoder 1022 compresses or encodes the data and time synchronizes the data in order to facilitate efficient real-time transmission and replication to a remote data repository 1030. The data encoder 1022 transmits the encoded data to the onboard data manager 1020 which then saves the encoded data in the crash hardened memory module 1018 and the queuing repository 1058 for replication to the remote data repository 1030 via a remote data manager 1032 located in the data center 1050. Optionally, the onboard data manager 1020 can save a tertiary copy of the encoded data in the non-crash hardened removable storage device of the eighth embodiment. The onboard data manager 1020 and the remote data manager 1032 work in unison to manage the data replication process. A single remote data manager 1032 in the data center 1050 can manage the replication of data from a plurality of assets 1048.

The data from the various input components and data from an in-cab audio/graphic user interface (GUI) 1060 are sent to a vehicle event detector 1056. The vehicle event detector 1056 processes the data to determine whether an event, incident or other predefined situation involving the asset 1048 has occurred. When the vehicle event detector 1056 detects signals that indicate a predefined event occurred, the vehicle event detector 1056 sends the processed data that a predefined event occurred along with supporting data surrounding the predefined event to the onboard data manager 1020. The vehicle event detector 1056 detects events based on data from a wide variety of sources, such as the analog inputs 1002, the digital inputs 1004, the I/O module 1006, the vehicle controller 1008, the engine controller 1010, the inertial sensors 1012, the GPS 1014, the cameras 1016, the route/crew manifest component 1024, the weather component 1026, the map component 1064, the PTC/signal data 1066, and the fuel data 1068, which can vary based on the asset's configuration. When the vehicle event detector 1056 detects an event, the detected asset event information is stored in a queuing repository 1058 and can optionally be presented to the crew of the asset 1048 via the in-cab audio/graphical user interface (GUI) 1060.

Figure 20:
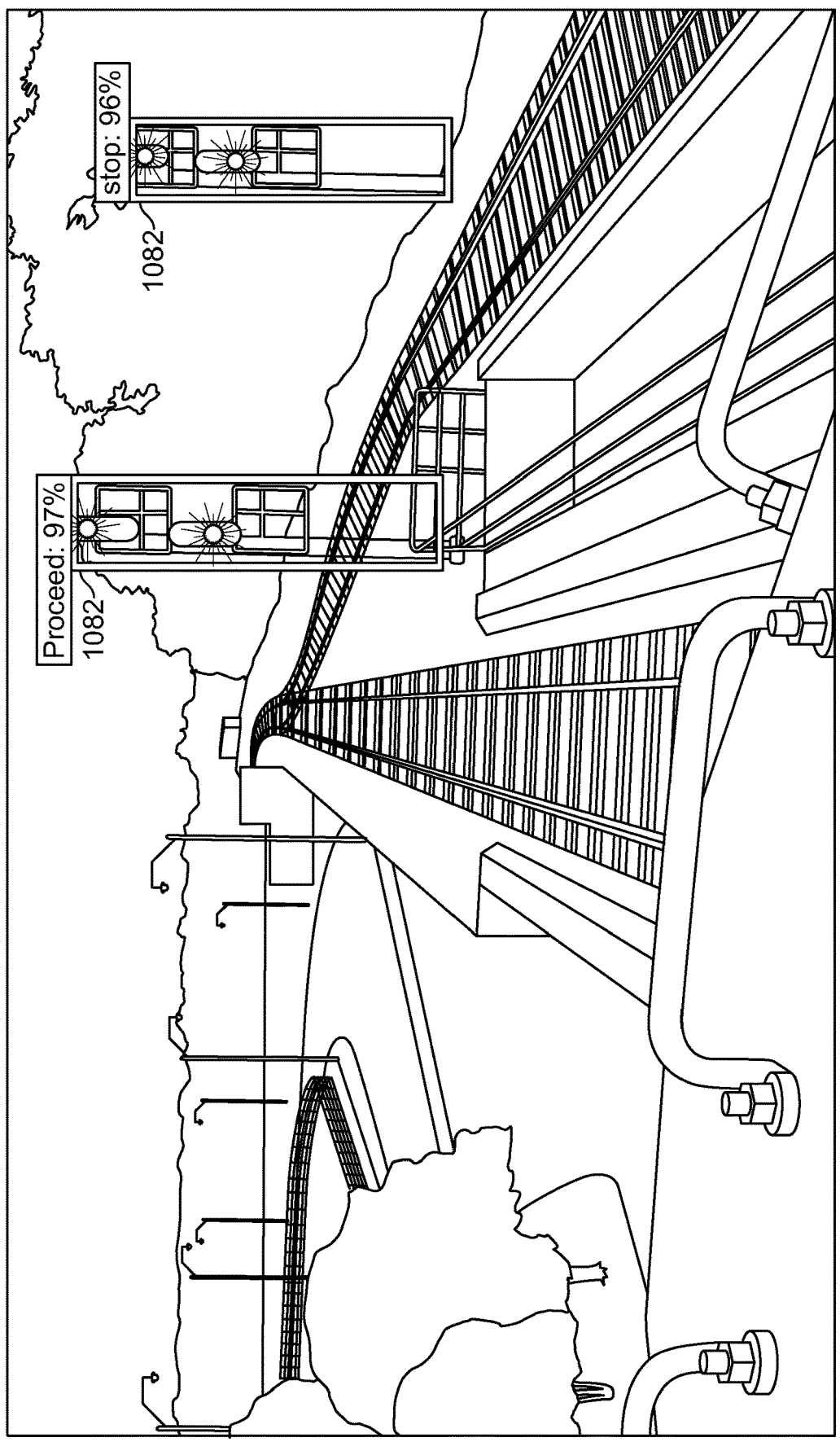
FIG. 20 is a diagram that illustrates exemplary signal detection of an automated signal compliance monitoring and alerting system in accordance with implementations of this disclosure.

When the asset's 1048 location indicates that a signal 1082 has been crossed, excessive braking has occurred and the asset 1048 stopped within close location of the signal 1082, or speed restrictions have been applied by a signal aspect, the onboard data manager 1020 will initiate outward facing camera image analysis to determine the meaning or aspect of the signal 1082, as shown in FIG. 20. Utilizing state of the art image processing techniques, outward facing camera footage can be analyzed, using a previously trained neural network or artificial intelligence component, to decipher the meaning of the signal aspect and operating rules implications. The analysis and/or processing by the neural network or artificial intelligence component, in this exemplary implementation, is done in a back office. In another embodiment, the analysis and/or processing by the neural network or artificial intelligence component is done on the asset 1048. The output of the signal aspect decoding is combined with other sensor data to determine whether the asset 1048 has grossly violated signal indication by occupying railroad tracks, in this exemplary implementation, which may lead to a train on train collision, or has operated in an unsafe manner to achieve signal compliance. When the asset 1048 is found to be out of compliance, an electronic alert will be stored in the back office, as well as delivered to users who have subscribed to receive such alerts, after associating the railroad's business rules to the signal and asset operations. These alerts can then be mined either directly via a database or by using the website graphical user interface, or a web client 1042, provided to users.

Additionally, an audible alert can be added to the cab of the asset 1048 which would alert the crew of an impending signal violation, impending bad situation that the crew may respond to faster in case the crew was distracted or otherwise not paying attention to a track obstruction, stop signal, and/or if the asset 1048 is speeding in a zone where the signal requires a lower speed limit.

The automated signal monitoring and alerting system 1080 is also enhanced to automatically perform video analytics to determine signal meaning each time a monitored asset crosses a signal, to automatically perform video analytics to determine signal meaning whenever an asset experiences excessive braking forces and comes to a stop within a pre-defined distance, and to monitor asset speed to determine whether the asset is moving at a speed greater than is authorized as determined by the signal aspect. The image analytics is done onboard the asset 1048 to reduce delay between the actual event and the electronic notification to users and/or subscribers. The functionality of the automated signal monitoring and alerting system 1080 is enhanced to allow automated inward and outward facing video downloads at the time of alert to enhance the user's experience and decrease the work necessary to investigate the event. The functionality of the automated signal monitoring and alerting system 1080 is also enhanced to provide real-time audible cues within the non-compliant asset 1048 to alert crew in case of distraction or other reason for not following safe operating practices with respect to signal rules and meaning.

Additionally, the automated signal monitoring and alerting system 1080 and/or video analytics system 910 may receive location information, including latitude and longitude coordinates, of a signal, such as a stop signal, traffic signal, speed limit signal, and/or object signal near the tracks, from the asset owner. The video analytics system 910 then determines whether the location information received from the asset owner is correct. If the location information is correct, the video analytics system 910 stores the information and will not recheck the location information again for a predetermined amount of time, such as checking the location information on a monthly basis. If the location information is not correct, the video analytics system 910 determines the correct location information and reports the correct location information to the asset owners, stores the location information, and will not recheck the location information again for a predetermined amount of time, such as checking the location information on a monthly basis. Storing the location information provides easier detection of a signal, such as a stop signal, traffic signal, speed limit signal, and/or object signal near the tracks.

The onboard data manager 1020 also sends data to the queuing repository 1058. In near real-time mode, the onboard data manager 1020 stores the encoded data received from the data encoder 1022 and any event information in the crash hardened memory module 1018 and in the queuing repository 1058. In the eighth embodiment, the onboard data manager 1020 can optionally store the encoded data in the non-crash hardened removable storage device. After five minutes of encoded data has accumulated in the queuing repository 1058, the onboard data manager 1020 stores the five minutes of encoded data to the remote data repository 1030 via the remote data manager 1032 in the data center 1050 over the wireless data link 1046 accessed through the wireless gateway/router 1072. In real-time mode, the onboard data manager 1020 stores the encoded data received from the data encoder 1022 and any event information to the crash hardened memory module 1018, and optionally in the non-crash hardened removable storage device, and to the remote data repository 1030 via the remote data manager 1032 in the data center 1050 over the wireless data link 1046 accessed through the wireless gateway/router 1072. The process of replicating data to the remote data repository 1030 requires a wireless data connection between the asset 1048 and the data center 1050. The onboard data manager 1020 and the remote data manager 1032 can communicate over a variety of wireless communications links, such as Wi-Fi, cellular, satellite, and private wireless systems utilizing the wireless gateway/router 1072. Wireless data link 1046 can be, for example, a wireless local area network (WLAN), wireless metropolitan area network (WMAN), wireless wide area network (WWAN), a private wireless system, a cellular telephone network or any other means of transferring data from the data recorder 1054 of DARS 1000 to, in this example, the remote data manager 1030 of DARS 1000. When a wireless data connection is not available, the data is stored in memory and queued in queueing repository 1058 until wireless connectivity is restored and the data replication process can resume.

In parallel with data recording, data recorder 1054 continuously and autonomously replicates data to the remote data repository 1030. The replication process has two modes, a real-time mode and a near real-time mode. In real-time mode, the data is replicated to the remote data repository 1030 every second. In near real-time mode, the data is replicated to the remote data repository 1030 every five minutes. The rate used for near real-time mode is configurable and the rate used for real-time mode can be adjusted to support high resolution data by replicating data to the remote data repository 1030 every 0.10 seconds. When the DARS 1000 is in near real-time mode, the onboard data manager 1020 queues data in the queuing repository 1058 before replicating the data to the remote data manager 1032. The onboard data manager 1020 also replicates the vehicle event detector information queued in the queueing repository 1058 to the remote data manager 1032. Near real-time mode is used during normal operation, under most conditions, in order to improve the efficiency of the data replication process.

Real-time mode can be initiated based on events occurring and detected by the vehicle event detector 1056 onboard the asset 1048 or by a request initiated from the data center 1050. A typical data center 1050 initiated request for real-time mode is initiated when a remotely located user 1052 has requested real-time information from the web client 1042. A typical reason for real-time mode to originate onboard the asset 1048 is the detection of an event or incident by the vehicle event detector 1056 such as an operator initiating an emergency stop request, emergency braking activity, rapid acceleration or deceleration in any axis, or loss of input power to the data recorder 1054. When transitioning from near real-time mode to real-time mode, all data not yet replicated to the remote data repository 1030 is replicated and stored in the remote data repository 1030 and then live replication is initiated. The transition between near real-time mode and real-time mode typically occurs in less than five seconds. After a predetermined amount of time has passed since the event or incident, a predetermined amount of time of inactivity, or when the user 1052 no longer desires real-time information from the asset 1048, the data recorder 1054 reverts to near real-time mode. The predetermined amount of time required to initiate the transition is configurable and is typically set to ten minutes.

When the data recorder 1054 is in real-time mode, the onboard data manager 1020 attempts to continuously empty its queue to the remote data manager 1032, storing the data to the crash hardened memory module 1018, and optionally to the non-crash hardened removable storage device, and sending the data to the remote data manager 1032 simultaneously. The onboard data manager 1020 also sends the detected vehicle information queued in the queueing repository 1058 to the remote data manager 1032.

Upon receiving data to be replicated from the data recorder 1054, along with data from the map component 1064, the route/crew manifest component 1024, and the weather component 1026, the remote data manager 1032 stores the compressed data to the remote data repository 1030 in the data center 1050 of DARS 1000. The remote data repository 1030 can be, for example, cloud-based data storage or any other suitable remote data storage. When data is received, a process is initiated that causes a data decoder 1036 to decode the recently replicated data for/from the remote data repository 1030 and send the decoded data to a remote event detector 1034. The remote data manager 1032 stores vehicle event information in the remote data repository 1030. When the remote event detector 1034 receives the decoded data, it processes the decoded data to determine if an event of interest is found in the decoded data. The decoded information is then used by the remote event detector 1034 to detect events, incidents, or other predefined situations, in the data occurring with the asset 1048. Upon detecting an event of interest from the decoded data, the remote event detector 1034 stores the event information and supporting data in the remote data repository 1030. When the remote data manager 1032 receives remote event detector 1034 information, the remote data manager 1032 stores the information in the remote data repository 1030.

The remotely located user 1052 can access information, including vehicle event detector information, relating to the specific asset 1048, or a plurality of assets, using the standard web client 1042, such as a web browser, or a virtual reality device (not shown) which, in this implementation, can display thumbnail images from selected cameras. The web client 1042 communicates the user's 1052 request for information to a web server 1040 through a network 1044 using common web standards, protocols, and techniques. Network 1044 can be, for example, the Internet. Network 1044 can also be a local area network (LAN), metropolitan area network (MAN), wide area network (WAN), virtual private network (VPN), a cellular telephone network or any other means of transferring data from the web server 1040 to, in this example, the web client 1042. The web server 1040 requests the desired data from the data decoder 1036. The data decoder 1036 obtains the requested data relating to the specific asset 1048, or a plurality of assets, from the remote data repository 1030 upon request from the web server 1040. The data decoder 1036 decodes the requested data and sends the decoded data to a localizer 1038. Localization is the process of converting data to formats desired by the end user, such as converting the data to the user's preferred language and units of measure. The localizer 1038 identifies the profile settings set by user 1052 by accessing the web client 1042 and uses the profile settings to prepare the information being sent to the web client 1042 for presentation to the user 1052, as the raw encoded data and detected event information is saved to the remote data repository 1030 using coordinated universal time (UTC) and international system of units (SI units). The localizer 1038 converts the decoded data into a format desired by the user 1052, such as the user's 1052 preferred language and units of measure. The localizer 1038 sends the localized data in the user's 1052 preferred format to the web server 1040 as requested. The web server 1040 then sends the localized data of the asset, or plurality of assets, to the web client 1042 for viewing and analysis, providing playback and real-time display of standard video, 360 degrees video, and/or other video. The web client 1042 can display and the user 1052 can view the data, video, and audio for a single asset or simultaneously view the data, video, and audio for a plurality of assets. The web client 1042 can also provide synchronous playback and real-time display of data along with the plurality of video and audio data from image measuring sources, standard video sources, 360 degrees video sources, and/or other video sources, and/or range measuring sources, on, in, or in the vicinity of the asset, nearby assets, and/or remotely located sites.

Figure 21:
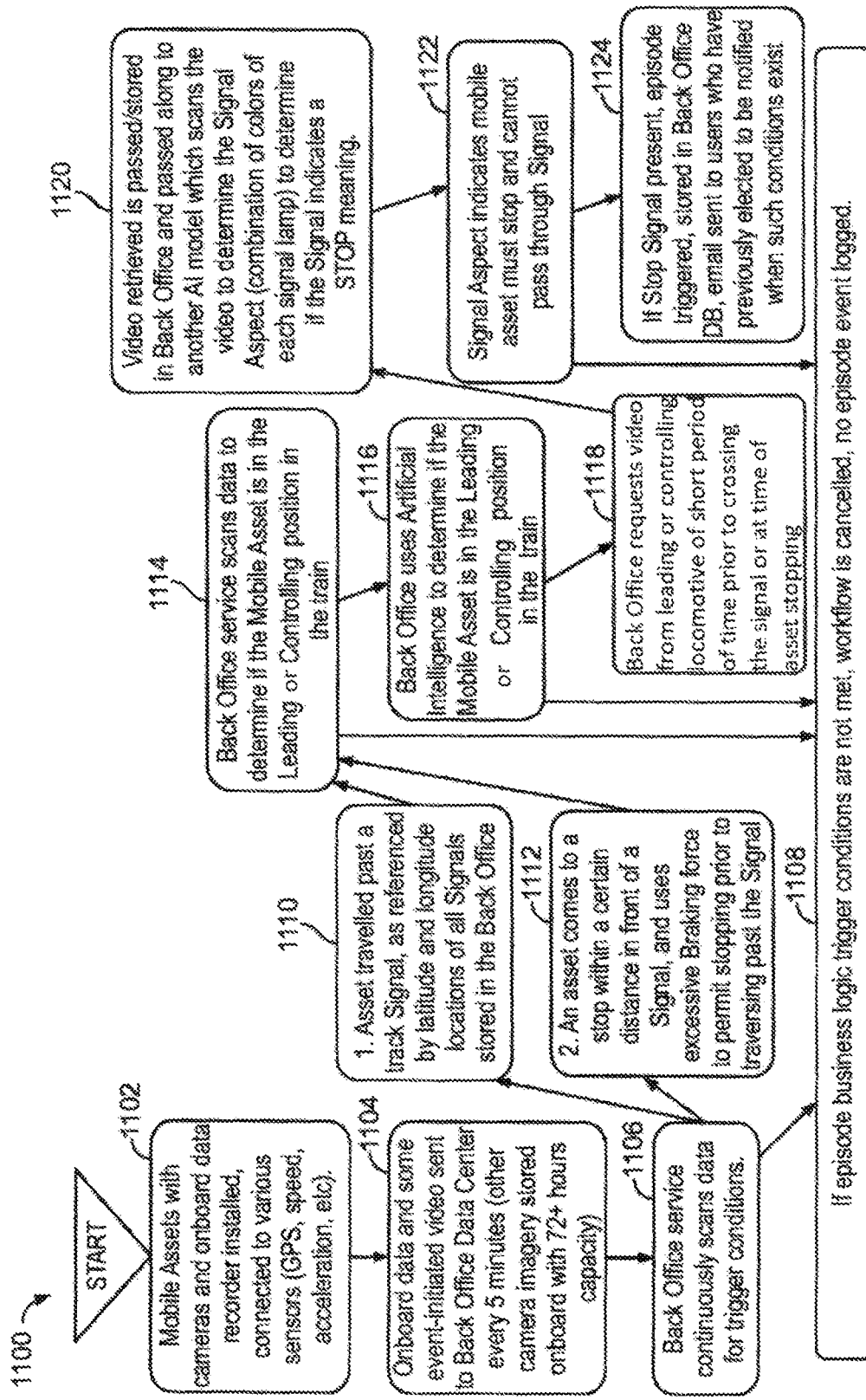
FIG. 21 is a flow diagram of a first embodiment of a process for determining signal compliance in accordance with implementations of this disclosure.

FIG. 21 is a flow diagram showing a first illustrated embodiment of a process 1100 for determining signal compliance in accordance with an implementation of this disclosure. After the DARS 1000 and cameras 1016 are installed and connected to various sensors on the asset 1048, such as analog inputs 1002, digital inputs 1004, I/O module 1006, vehicle controller 1008, engine controller 1010, inertial sensors 1012, global positioning system (GPS) 1014, cameras 1016, positive train control (PTC)/signal data 1066, fuel data 1068, cellular transmission detectors (not shown), internally driven data and any additional data signals, 1102, onboard data from the various sensors and/or event-initiated video and/or still images are sent to a back office data center 1050 (FIG. 19) or to an onboard data center (not shown) every five minutes and camera imagery is stored onboard the asset 1048 with over 72 hours of capacity 1104. The back office data center 1074 service continuously scans the data for trigger conditions 1106. If episode business logic trigger conditions are not met, the workflow is cancelled and no episode event is logged 1108. If the asset 1048 travelled past a track signal 1082 as referenced by latitude and longitude coordinates of all signals stored in the back office data center 1050 or onboard data center 1110 and/or the asset 1048 came to a stop within a certain distance in front of the signal 1082 and used excessive braking force to permit stopping prior to traversing past the signal 1082 1112, the back office data center 1050 or the onboard data center service scans the data to determine if the train car, in this illustrated embodiment, is in the leading and/or controlling position in the train asset 1048 1114. The back office data center 1050 or the onboard data center uses a first artificial intelligence model to determine if the train car is in the leading and/or controlling position in the train asset 1048 1116. If the train car is not in the leading and/or controlling position in the train asset 1048, the episode business logic trigger conditions are not met, the workflow is cancelled and no episode event is logged 1108. If the train car is in the leading and/or controlling position in the train asset 1048, the back office data center 1050 and/or the onboard data center requests video content from the lead and/or controlling position locomotive taken a short period of time prior to crossing the signal 1082 and/or at the time of the asset 1048 stopping 1118. The video content retrieved is passed and/or stored in the back office data center 1050 and/or the onboard data center and passed along to a second artificial intelligence model that scans the video content to determine the signal 1082 aspect, such as the combination of colors of each signal lamp, to determine if the signal 1082 indicates a STOP meaning 1120. The back office data center 1050 and/or the onboard data center determines whether the signal 1082 aspect indicates that the asset 1048 must stop and cannot pass through the signal 1082 1122. If the signal 1082 aspect does not indicate that the asset 1048 must stop and cannot pass through the signal 1082, the episode business logic trigger conditions are not met, the workflow is cancelled and no episode event is logged 1108. If the signal 1082 aspect does indicate that the asset 1048 must stop and cannot pass through the signal 1082 and the stop signal is present, an episode is triggered, stored in the back office data center database 1050 and/or in the onboard data center database, and emails are sent to users who have previously elected to be notified when such conditions exist 1124.

For simplicity of explanation, process 1100 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for processing data from at least one mobile asset comprising the steps of:
   receiving, using one of a data center remote from the at least one mobile asset and a data center onboard the at least one mobile asset, data based on at least one data signal from at least one of:
      at least one data source onboard the at least one mobile asset; and
      at least one data source remote from the at least one mobile asset;
   determining, using a first artificial intelligence model of at least one of the data center onboard the at least one mobile asset and the data center remote from the at least one mobile asset, that the at least one mobile asset is at least one of a leading mobile asset and a controlling mobile asset on a condition that at least one trigger condition was detected, using the data center onboard the at least one mobile asset and the data center remote from the at least one mobile asset, based on the data;
   obtaining, using at least one of the data center onboard the at least one mobile asset and the data center remote from the at least one mobile asset, video content from the at least one of the leading mobile asset and the controlling mobile asset, the video content comprising a configurable predetermined amount of the data collected for a configurable predetermined amount of time prior to the at least one trigger condition;
   storing, using at least one of a database of the data center onboard the at least one mobile asset and a database of the data center remote from the at least one mobile asset, the video content;
   determining, using a second artificial intelligence model of at least one of the data center onboard the at least one mobile asset and the data center remote from the at least one mobile asset, an episode based on the video content;
   storing, using at least one of the database of the data center onboard the at least one mobile asset and the database of the data center remote from the at least one mobile asset, the episode; and
   sending, using at least one of the data center onboard the at least one mobile asset and the data center remote from the at least one mobile asset, an electronic message to a predetermined amount of users.

2. The method of claim 1, the at least one trigger condition comprising at least one of:
   the data indicates that the at least one mobile asset travelled past a signal of a plurality of signals, the signal comprising a location referenced by latitude and longitude coordinates of the plurality of signals stored in the database of at least one of the data center onboard the at least one mobile asset and the data center remote from the at least one mobile asset;
   the data indicates that the at least one mobile asset came to a stop within a predetermined distance of the signal of the plurality of signals and the at least one mobile asset used excessive braking force to permit the stop prior to the location of the signal; and
   the data indicates speed restrictions.

3. The method of claim 2, the episode comprising the at least one trigger condition.

4. The method of claim 1, the data comprising at least one of:
   data from at least one camera on, in, or in the vicinity of the at least one mobile asset, image analytics, analog parameters, analog inputs, digital parameters, digital inputs, I/O module, vehicle controller, engine controller, inertial sensors, cameras, positive train control (PTC)/signal data, fuel data, cellular transmission detectors, internally driven data, map data, speed, pressure, temperature, current, voltage, acceleration, Boolean data, switch position, actuator position, warning light illumination, actuator command, global positioning system (GPS) data, braking forces, automated electronic notifications, geographic information system (GIS) data, position, speed, altitude, internally generated information, regulatory speed limit, video information, image information, audio information, route information, schedule information, cargo manifest information, environmental conditions information, current weather conditions, forecasted weather conditions, asset control status, operational data, and data generated by positive train control (PTC).

5. The method of claim 1, the data originating from at least one of the at least one mobile asset and at least one nearby asset.

6. The method of claim 1, the data received, using one of the data center remote from the at least one mobile asset and the data center onboard the at least one mobile asset, at least every five minutes.

7. The method of claim 1, the data comprising at least one of:
   video information from cameras located at at least one of in the mobile asset, on the mobile asset, and in the vicinity of the mobile asset;
   image information from cameras located at at least one of in the mobile asset, on the mobile asset, and in the vicinity of the mobile asset; and
   audio information from microphones located at at least one of in the mobile asset, on the mobile asset, and in the vicinity of the mobile asset.

8. The method of claim 1, the video content comprising at least one of:
   video information from cameras located at at least one of in the mobile asset, on the mobile asset, and in the vicinity of the mobile asset;
   image information from cameras located at at least one of in the mobile asset, on the mobile asset, and in the vicinity of the mobile asset; and audio information from microphones located at at least one of in the mobile asset, on the mobile asset, and in the vicinity of the mobile asset.

9. The method of claim 1, the at least one data source onboard the at least one mobile asset comprises at least one of analog inputs, digital inputs, I/O module, vehicle controller, engine controller, inertial sensors, global positioning system (GPS), at least one camera, positive train control (PTC)/signal data, fuel data, cellular transmission detectors, and internally driven data.

10. The method of claim 1, the at least one data source remote from the at least one mobile asset comprising at least one of route/crew manifest component, weather component, and map component.

11. The method of claim 1, at least one of the at least one data source onboard the at least one mobile asset and at least one data source remote from the at least one mobile asset comprising at least one of at least one 360 degrees camera, at least one fixed camera, at least one narrow view camera, at least one wide view camera, at least one 360 degrees fisheye view camera, and at least one of a radar and a light detection and ranging (LIDAR).

12. The method of claim 1, further comprising:
playing an audible alert in the at least one mobile asset on a condition that the episode is detected.

13. A system for processing data from at least one mobile asset comprising:
at least one of at least one image measuring device, at least one video measuring device, at least one range measuring device, and at least one microphone;
at least one of a data center onboard the at least one mobile asset and a data center remote from the at least one mobile asset, the data center adapted to receive data based on the at least one data signal;
a data recorder onboard the at least one mobile asset adapted to receive at least one data signal from at least one of the at least one image measuring device, the at least one video measuring device, the at least one range measuring device, the at least one microphone, the at least one data source onboard the at least one mobile asset, and the at least one data source remote from the at least one mobile asset;
a first artificial intelligence model of at least one of the data center onboard the at least one mobile asset and the data center remote from the at least one mobile asset, the first artificial intelligence model adapted to determine that the at least one mobile asset is at least one of a leading mobile asset and controlling mobile asset on a condition that at least one trigger condition was detected by at least one of the data center onboard the at least one mobile asset and the data center remote from the at least one mobile asset based on the data;
a database of at least one of the data center onboard the at least one mobile asset and the data center remote from the at least one mobile asset, the database adapted to store video content obtained from at least one of the at least one image measuring device, the at least one video measuring device, the at least one range measuring device, the at least one microphone, the at least one data source onboard the at least one mobile asset, and the at least one data source remote from the at least one mobile asset; and
a second artificial intelligence model of at least one of the data center onboard the at least one mobile asset and the data center remote from the at least one mobile asset, the second artificial intelligence model adapted to determine an episode based on the video content.

14. The system of claim 13, the at least one trigger condition comprising at least one of:
the data indicates that the at least one mobile asset travelled past a signal of a plurality of signals, the signal comprising a location referenced by latitude and longitude coordinates of the plurality of signals stored in the database of the data center;
the data indicates that the at least one mobile asset came to a stop within a predetermined distance of the signal of the plurality of signals and the at least one mobile asset used excessive braking force to permit the stop prior to the location of the signal; and
the data indicates speed restrictions.

15. The system of claim 14, the episode comprising the at least one trigger condition.

16. The system of claim 13, the image measuring device comprising at least one of at least one 360 degrees camera, at least one fixed camera, at least one narrow view camera, at least one wide view camera, and at least one 360 degrees fisheye view camera.

17. The system of claim 13, the range measuring device comprising at least one of a radar and a light detection and ranging (LIDAR).

18. The system of claim 13, the data comprising at least one of:
data from at least one camera on, in, or in the vicinity of the at least one mobile asset, image analytics, analog parameters, analog inputs, digital parameters, digital inputs, I/O module, vehicle controller, engine controller, inertial sensors, cameras, positive train control (PTC)/signal data, fuel data, cellular transmission detectors, internally driven data, map data, speed, pressure, temperature, current, voltage, acceleration, Boolean data, switch position, actuator position, warning light illumination, actuator command, global positioning system (GPS) data, braking forces, automated electronic notifications, geographic information system (GIS) data, position, speed, altitude, internally generated information, regulatory speed limit, video information, image information, audio information, route information, schedule information, cargo manifest information, environmental conditions information, current weather conditions, forecasted weather conditions, asset control status, operational data, and data generated by positive train control (PTC).

19. The system of claim 13, the data originating from at least one of the at least one mobile asset and at least one nearby asset.

20. The system of claim 13, the data comprising at least one of:
video information from cameras located at at least one of in the mobile asset, on the mobile asset, and in the vicinity of the mobile asset;
image information from cameras located at at least one of in the mobile asset, on the mobile asset, and in the vicinity of the mobile asset; and
audio information from microphones located at at least one of in the mobile asset, on the mobile asset, and in the vicinity of the mobile asset.

21. The system of claim 13, the video content comprising at least one of:
video information from cameras located at at least one of in the mobile asset, on the mobile asset, and in the vicinity of the mobile asset;
image information from cameras located at at least one of in the mobile asset, on the mobile asset, and in the vicinity of the mobile asset; and audio information from microphones located at at least one of in the mobile asset, on the mobile asset, and in the vicinity of the mobile asset.

22. The system of claim 13, the at least one data source onboard the at least one mobile asset comprises at least one of analog inputs, digital inputs, I/O module, vehicle controller, engine controller, inertial sensors, global positioning system (GPS), at least one camera, positive train control (PTC)/signal data, fuel data, cellular transmission detectors, and internally driven data.

23. The system of claim 13, the at least one data source remote from the at least one mobile asset comprising at least one of route/crew manifest component, weather component, and map component.

24. The system of claim 13, further comprising:
an audible alert adapted to play a sound on a condition that the episode is detected.

\* \* \* \* \*